United States Patent
Jaynes

(10) Patent No.: US 10,965,883 B2
(45) Date of Patent: Mar. 30, 2021

(54) INTELLIGENT SHARED DISPLAY INFRASTRUCTURE AND ASSOCIATED METHODS

(71) Applicant: Mersive Technologies, Inc., Denver, CO (US)

(72) Inventor: Christopher O. Jaynes, Denver, CO (US)

(73) Assignee: MERSIVE TECHNOLOGIES, INC., Denver, CO (US)

( * ) Notice: Subject to any disclaimer, the term of this patent is extended or adjusted under 35 U.S.C. 154(b) by 325 days.

(21) Appl. No.: 14/719,190

(22) Filed: May 21, 2015

(65) Prior Publication Data

US 2015/0341570 A1    Nov. 26, 2015

Related U.S. Application Data

(60) Provisional application No. 62/001,483, filed on May 21, 2014.

(51) Int. Cl.
*G06F 15/16*       (2006.01)
*H04N 5/268*       (2006.01)
(Continued)

(52) U.S. Cl.
CPC ........... *H04N 5/268* (2013.01); *G06F 3/0482* (2013.01); *G06F 3/04817* (2013.01);
(Continued)

(58) Field of Classification Search
CPC .. G03B 19/00; G06Q 10/00; G06Q 10/06314; G06Q 30/02; G06Q 20/20; G06Q 30/0264; G06Q 10/10; G06F 3/048; G06F 3/1423; G06F 3/1454; G06F 21/606; G06F 3/0482; H04L 12/1822; H04L 41/0213; H04L 63/0428; H04L 67/125;
(Continued)

(56) References Cited

U.S. PATENT DOCUMENTS 5,124,912 A  *  6/1992  Hotaling ......... G06Q 10/06314
                                                    40/107
6,614,450 B1 *  9/2003  Vossler ................ G06F 3/1423
                                                    715/751
(Continued)

FOREIGN PATENT DOCUMENTS

WO       20070119125 A1     10/2007

OTHER PUBLICATIONS

PCT/US2015/032038 International Search Report and Written Opinion dated Aug. 21, 2015 8 pages.
(Continued)

*Primary Examiner* — Dustin Nguyen
(74) *Attorney, Agent, or Firm* — Lathrop GPM LLP

(57) ABSTRACT

A two-tier display infrastructure switching architecture and associated method interconnects a plurality of network-enabled display devices. A video streaming switch is capable of receiving a video stream from a first network-enabled display device and forwarding the video stream to a second network-enabled display device. An access control service is capable of controlling access rights of each of the first and second network-enabled display devices to transfer video streams stream through the video streaming switch.

20 Claims, 18 Drawing Sheets

(51) Int. Cl.
  *H04L 29/06* (2006.01)
  *H04N 7/15* (2006.01)
  *G06F 3/0481* (2013.01)
  *G06F 3/0482* (2013.01)
  *G06F 3/16* (2006.01)
  *H04L 29/08* (2006.01)

(52) U.S. Cl.
  CPC .............. *G06F 3/165* (2013.01); *H04L 65/10* (2013.01); *H04L 65/1069* (2013.01); *H04L 65/4069* (2013.01); *H04L 67/22* (2013.01); *H04N 7/15* (2013.01)

(58) Field of Classification Search
  CPC ...... H04L 65/403; H04L 67/025; H04W 4/00; H04W 88/16; H04N 21/4126; H04N 7/15; A63J 25/00
  See application file for complete search history.

(56) References Cited

U.S. PATENT DOCUMENTS

| | | | | |
|---|---|---|---|---|
| 6,735,616 | B1* | 5/2004 | Thompson | H04L 67/025 |
| | | | | 360/79 |
| 10,262,327 | B1* | 4/2019 | Hardebeck | G06Q 30/02 |
| 2002/0184361 | A1* | 12/2002 | Eden | H04L 41/0213 |
| | | | | 709/223 |
| 2003/0191836 | A1* | 10/2003 | Murtha | H04L 67/125 |
| | | | | 709/224 |
| 2004/0015401 | A1* | 1/2004 | Lee | G06Q 20/20 |
| | | | | 705/16 |
| 2004/0075619 | A1* | 4/2004 | Hansen | G06F 3/1454 |
| | | | | 345/1.1 |
| 2004/0162804 | A1* | 8/2004 | Strittmatter | H04W 4/00 |
| 2005/0036509 | A1* | 2/2005 | Acharya | H04L 63/0428 |
| | | | | 370/466 |
| 2005/0043973 | A1* | 2/2005 | Childers | G06F 21/606 |
| | | | | 705/5 |
| 2005/0213734 | A1 | 9/2005 | Rodman | |
| 2006/0026502 | A1 | 2/2006 | Dutta | |
| 2006/0031779 | A1* | 2/2006 | Theurer | G06F 3/1454 |
| | | | | 715/781 |
| 2006/0133414 | A1* | 6/2006 | Luoma | H04W 88/16 |
| | | | | 370/466 |
| 2007/0247447 | A1* | 10/2007 | Mack | G06Q 30/02 |
| | | | | 345/204 |
| 2008/0043962 | A1 | 2/2008 | Daniell | |
| 2008/0091778 | A1* | 4/2008 | Ivashin | G06Q 10/10 |
| | | | | 709/204 |
| 2008/0098305 | A1* | 4/2008 | Beland | G06F 3/0482 |
| | | | | 715/719 |
| 2009/0138921 | A1 | 5/2009 | Miyata | |
| 2009/0144157 | A1* | 6/2009 | Saracino | G06Q 30/02 |
| | | | | 705/14.73 |
| 2009/0186700 | A1* | 7/2009 | Konkle | A63J 25/00 |
| | | | | 463/42 |
| 2009/0217177 | A1 | 8/2009 | DeGrazia | |
| 2010/0138509 | A1* | 6/2010 | Castaldi | G03B 19/00 |
| | | | | 709/206 |
| 2010/0199191 | A1 | 8/2010 | Takahashi | |
| 2011/0081920 | A1 | 4/2011 | Hung et al. | |
| 2011/0246908 | A1 | 10/2011 | Akram et al. | |
| 2011/0271129 | A1* | 11/2011 | Flannagan | H04L 12/1822 |
| | | | | 713/323 |
| 2012/0054793 | A1 | 3/2012 | Kang et al. | |
| 2012/0089722 | A1* | 4/2012 | Enholm | G06Q 10/00 |
| | | | | 709/223 |
| 2012/0314018 | A1 | 12/2012 | Wengrovitz et al. | |
| 2013/0027613 | A1* | 1/2013 | Kim | H04N 21/4126 |
| | | | | 348/563 |
| 2013/0057764 | A1 | 3/2013 | Choi et al. | |
| 2013/0065538 | A1 | 3/2013 | Kim | |
| 2013/0071087 | A1 | 3/2013 | Motiwala et al. | |
| 2013/0097533 | A1* | 4/2013 | Hong | G06F 3/048 |
| | | | | 715/762 |
| 2013/0286155 | A1* | 10/2013 | Maeda | H04N 7/15 |
| | | | | 348/14.08 |
| 2014/0115502 | A1 | 4/2014 | Van Wie et al. | |
| 2014/0149221 | A1* | 5/2014 | Rycyna, III | G06Q 30/0264 |
| | | | | 705/14.61 |
| 2014/0173108 | A1 | 6/2014 | Lee | |
| 2014/0185567 | A1 | 7/2014 | Plipponen | |
| 2014/0215358 | A1* | 7/2014 | Uratani | G06F 3/048 |
| | | | | 715/753 |
| 2014/0267577 | A1 | 9/2014 | Weber et al. | |
| 2014/0306865 | A1* | 10/2014 | Pan | G06F 3/1423 |
| | | | | 345/2.1 |
| 2015/0256627 | A1 | 9/2015 | Patil | |
| 2015/0378665 | A1* | 12/2015 | Han | H04N 21/4126 |
| | | | | 345/2.2 |
| 2017/0195374 | A1* | 7/2017 | Vu | H04L 65/403 |

OTHER PUBLICATIONS

PCT/US2015/029716 International Search Report and Written Opinion dated Aug. 7, 2015, 8 pages.

U.S. Appl. No. 14/190,318, Office Action dated Feb. 16, 2016, 16 pages.

U.S. Appl. No. 14/706,431, Non-Final Rejection dated Mar. 30, 2016, 20 pages.

International Search Report and Written Opinion corresponding to International Patent Application No. PCT/US2016/044581, dated Oct. 20, 2016, 7 pages.

* cited by examiner

INTELLIGENT SHARED DISPLAY INFRASTRUCTURE AND ASSOCIATED METHODS

RELATED APPLICATIONS

This application claims priority to U.S. Patent Application Ser. No. 62/001,483, titled "Intelligent Shared Display Infrastructure", filed May 21, 2014, and incorporated herein by reference.

BACKGROUND/PROBLEM TO BE SOLVED

Many conference rooms have shared displays that are manually configured to show shared media. However, these shared displayed lack intelligence, configurability, and manageability.

SUMMARY

In one embodiment, a two-tier display infrastructure switching architecture interconnects a plurality of network-enabled display devices. A video streaming switch is capable of receiving a video stream from a first network-enabled display device and forwarding the video stream to a second network-enabled display device. An access control service is capable of controlling transfer of the video stream through the video stream switch based upon access rights of each of the first and second network-enabled display devices to use the video streaming switch.

In another embodiment, a network-enabled display device with display analytic capture, includes a communication mechanism capable of transferring video metadata in parallel with a video stream, a display analytic database for storing the metadata in relation to the video stream when transferred via the communication mechanism, and a display analytic communication module for providing access to the display analytic database by a third party.

In another embodiment, a method captures display analytic on a network-enabled display device. A number of users connected to the network-enabled display device is captured over time and stored within a display analytic database. Display activity is measured over time based upon one or more of: a number of different video streams transmitted to the display device over time, a number of control signals transmitted to a display to modify its appearance and layout, and a number of connections and disconnection. Certain information from the analytic database is reported on demand over a network.

In another embodiment, a method visually associates grouped video streams on a network-enabled display device. Grouped video streams are determined based upon logical arrangement, by one or more users of the network-enabled display device, of the video streams on the network-enabled display device. The grouped video streams are displayed as a visual element on the network-enabled display device, and each video stream within the group is collectively manipulated based upon manipulations to the visual element by the one or more users.

In another embodiment, a method schedules availability of a network-enabled display device. A period defining intended use of the network-enabled display device is received from a user. Information related to one or more of display appearance, access rights, control rights, media types allowed, and arrangement control of media posts is received from the user. Display specific visual resource description defining how the network-enabled display device presents media streams received during the period is received from the user. The information is stored and an appearance and access rights of the network-enabled display device during the period is controlled based upon the information received from the user and the display specific visual resource description.

In another embodiment, a method indicates ownership of a video stream on a network-enabled display device. Ownership of each of a plurality of video streams displayed on the network-enabled display device is determined based upon metadata of the video stream. An icon representing each different owner of the video streams is displayed on the network-enabled display device, and ownership of each displayed video stream owned by one owner corresponding to a selected one of the icon is graphically indicated.

In another embodiment, a method controls display of video streams on a network-enabled display device by a first user authenticated as a moderator. A connection attempt from a second user of the network-enabled display is received within the network-enabled display device. Metadata associated with the second user is received within the network-enabled display device. A connection request including the metadata is forwarded to the first user. In response to the connection request and display of the metadata to the first user, an accept/reject indication is received, and an accept connection signal is transmitted to the second user when the accept/reject indication indicates accept. A reject connection signal is transmitted to the second user when the accept/reject indication indicates reject.

In another embodiment, a method arranges smart video streams on a network-enabled display device. Video and metadata network streams are received within the network-enabled display device. One or more of the video and metadata network streams is transmitted to a video arrangement processor. The video arrangement processor, implementing an algorithm that automatically arranges display of the one or more video streams by the network-enabled display device, is used to process the video and metadata network streams to determine a stream transform, which is sent from the video arrangement processor to the network-enabled display device. The position/scale/rotation and visual appearance of the video stream is modified within the network-enabled display device based on the stream transform.

In another embodiment, a network-enabled display device has media file sharing capability. The display device includes a media sharing authentication module having machine readable instructions that when executed by a processor of the network-enabled display device are capable of performing the steps of: receiving, within the network-enabled display device, a media sharing request including an identifier of a media stream and a target user; determining whether the target user can receive a media file associated with the media stream; and transferring the media file to the target user when the target user can receive the media file.

In another embodiment, a network-enabled display device has proximate audible discovery, and includes an audio protocol encoder for encoding a connection information packet into an audio sequence; an audio processor for driving a speaker to output the audio sequence as sound; and a connection control module for controlling when the audio processor outputs the audio sequence, such that the sound is received by a microphone of a client device that (a) decodes the audio signal to determine the connection information packet and (b) connects the client device to the network-enabled display device based upon the connection information packet.

In another embodiment, a method connects a client device to a network-enabled display device. An audio signal from the network-enabled display device is received within the client device via a microphone coupled with the client device. The audio signal is decoded into a connection information packet, and a network interface of the client device is configured to (a) couple with a network identified within the connection information packet and (b) to connect with the network-enabled display device using network parameters defined within the connection information packet.

DETAILED DESCRIPTION OF THE EMBODIMENTS

Each of the sections below covers a significant aspect of a software system that utilizes standard computing platforms, combined with various display devices ("displays") to create a shared and accessible infrastructure of displays. Client displays connect to, share video information, and control this display infrastructure, enabling multiple media streams (referred to as "posts") on displays that are "published" from clients.

Two-Tier Display Infrastructure Switching Architecture for Multi-User Shared Displays In the following description, a "network-enabled display device" includes a display, a processing unit, and a network interface. In one embodiment, the network enabled display device is a flat-panel display connected to a networked computer via a video cable. In another embodiment, the network enabled display device is a smart-TV that includes an embedded processing unit. The network enabled display device also includes software-implemented algorithms that are executed by the processing unit to provide the functionality described herein.

The network-enabled display devices support video streaming from client image generators (hereinafter also called client devices) that can discover and connect to them. Once connected, client devices are able to publish multiple video streams to the network enabled display device, sharing the display screen to collaboratively view image data. Systems and methods described herein extend this sharing capability to a two-tier display infrastructure that connects network enabled display devices to one another through a secondary video streaming service.

Figure 1:
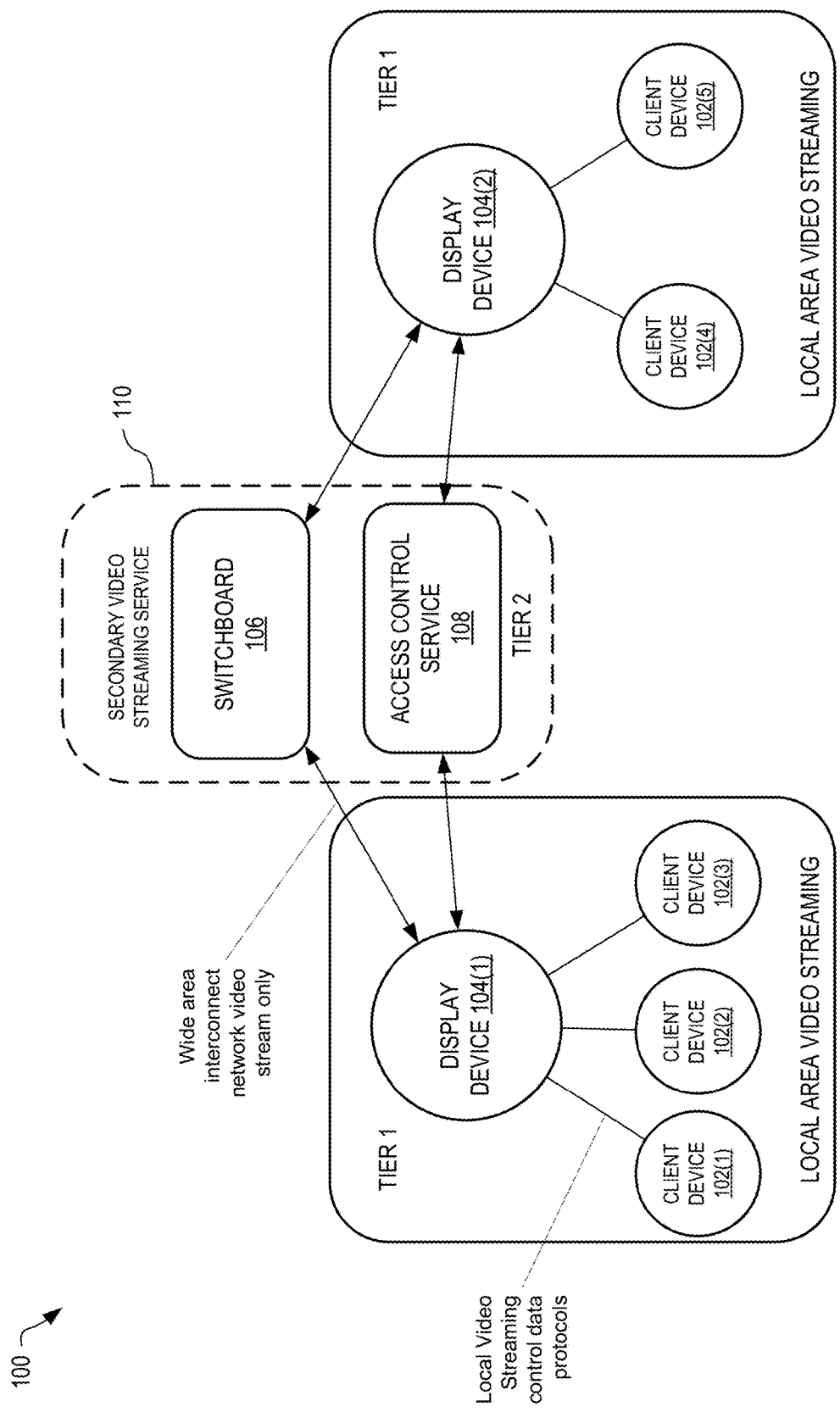
FIG. 1 depicts one exemplary intelligent shared display infrastructure, in an embodiment.

FIG. 1 is a high level schematic of one exemplary intelligent shared display infrastructure 100. Client devices 102 connect to network enabled display devices 104 through a local network. This local connection carries video data, video metadata, and control packets.

At tier 1, client devices 102 connect to a network-enabled display device 104 through a local area network connection, utilizing either a physical network cable or wireless medium. The connection process utilizes a protocol that exchanges client information with network enabled display device 104 to determine access rights, and transfer other metadata including user name, and other client-specific metadata. Once connected, client devices 102 may stream media to network-enabled display device 104, and control the appearance of media displayed on network-enabled display device 104.

At tier 2, a network-enabled display device video streaming switch (hereinafter "switchboard") 106 and an access control service 108 form a global video streaming service 110 and cooperate to connect network-display devices 104 together over both local area networks and wide-area networks. One or both of the switchboard 106 and the access control service 108 are implemented as machine readable instructions that are executed by a processor of a computer (e.g., a server) to implement the functionality described herein. The access control service 108 manages access rights of network-enabled display devices 104 to access the switchboard 106 and to stream video through the switchboard 106. At the tier 2 level, network-enabled display devices 104 become "clients" of one another and are able to connect to other network-enabled display devices, stream media, and control the appearance of media on other display devices.

With the intelligent shared display infrastructure 100, network-enabled display devices 104 are now able to connect to and communicate with a global service (i.e., streaming service 110) that supports wide-area connections. The switchboard 106 receives network enabled display device input streams and forwards them to other network enabled display devices 104 that act as subscribers. This intelligent shared display infrastructure 100 is unique in that client devices need not be aware of the switchboard and any potential complexities it could entail. Instead, network enabled display devices 104 continue to receive input signals from clients 102 and then selectively forward those signals to the switchboard 106 when appropriate. In this way, local area video performance is not impacted for users that are local to the display 104. When the need to transmit video to remote viewers arises, the network enabled display device 104 either encodes its own display surface as a new video stream transmitted to the switchboard 106, transmits partial image regions, and/or transmits independent posts already being transmitted by clients 102 connected to the display 104.

Network enabled display devices 104 support video streaming to displays from client (image generator) devices 102 so that clients may connect and utilize display screens in an ad hoc manner. Streaming service 110 extends this concept to become a potentially global infrastructure of interconnected displays 104.

Traditional video streaming systems support a single set of video sources that are broadcast/transmitted to a set of subscriber clients. An example of this type of video streaming system is a video streaming HTML server wherein web clients connect, subscribe and receive a transmitted video stream. In addition other architectures support a peer-to-peer mechanism that allows clients to receive video directly from other clients. Neither of these prior art systems or architectures meets the needs of a distributed display infrastructure whose key characteristics are:

1) Direct, local network connection support between clients and their displays
2) The ability of displays to communicate and stream video to one another on-demand without impacting local network streaming to either of the display endpoints The present switchboard 106 organizes connections from multiple network-enabled display devices 104 into two classes—producers and consumers. Network enabled display devices 104 may become producers and/or consumers by contacting the switchboard 106 directly and then requesting to become either a producer or consumer. In some cases, displays need to have the appropriate credentials in order to become a producer or consumer. In those cases, the displays contact the access control service 108 and request the appropriate credentials. Credentials may be granted or denied at this stage based on a number of factors including whether the display 104 requesting credentials has paid a subscription, or if the display 104 requesting credentials for a particular produced stream is presently over-subscribed.

The switchboard 106, then, is a central manager for a set of video producers and consumers (e.g., displays 104) that may be connected together in order to support video transmission from any set of endpoints (e.g., clients 102) to one another.

Switchboard Directory Service.

The switchboard 106 also contains a directory listing service database that encodes a unique identifier for each listed display. In addition to the unique identifiers, the directory listing service encodes which displays 104 are able to connect with one another. In addition the directory listing service encodes display class information that, in part, determines which displays are able to connect, receive information about, or ignore one another.

Figure 2:
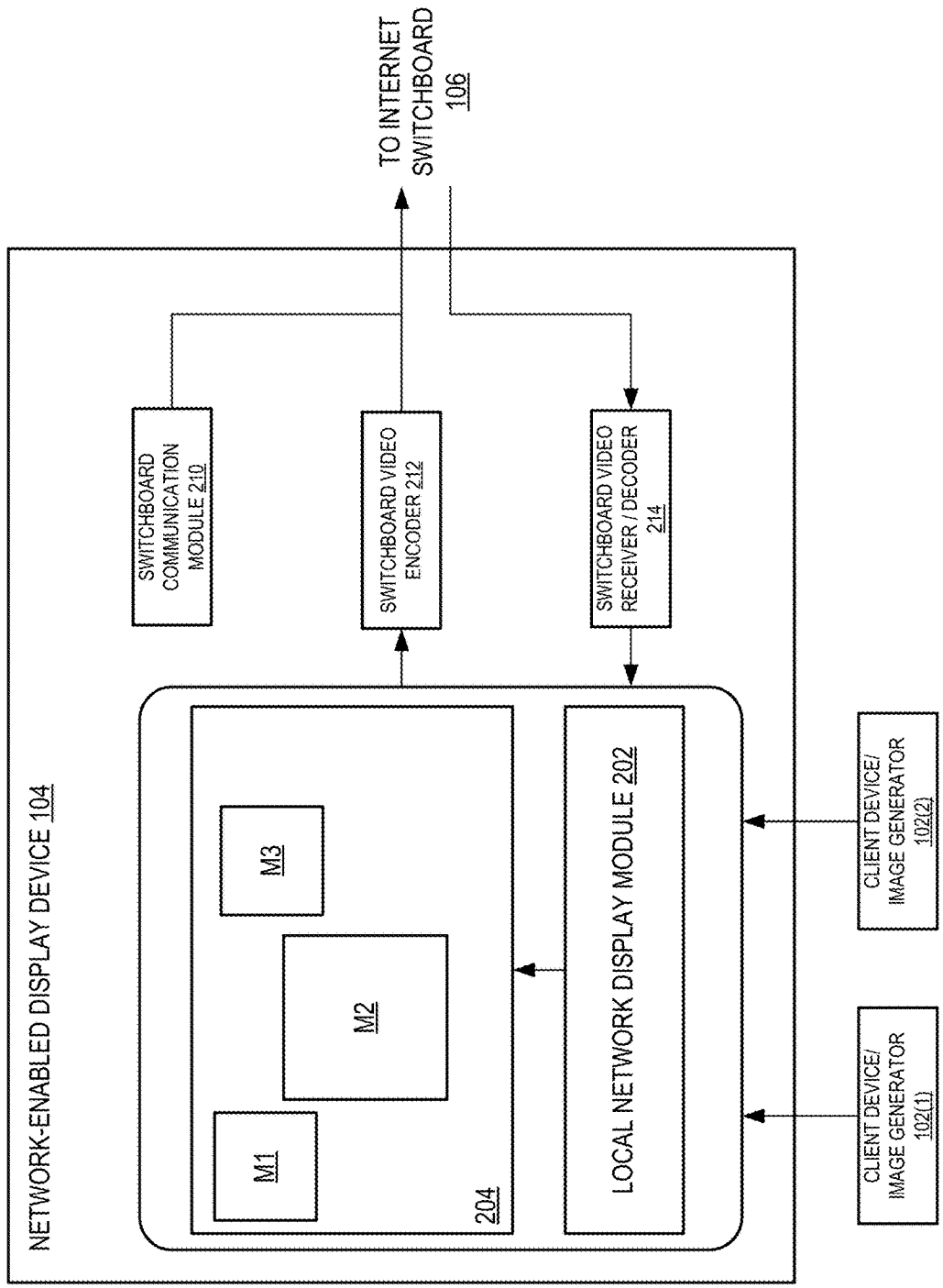
FIG. 2 depicts how a traditional network-enabled display device is augmented for operation with the intelligent shared display infrastructure of FIG. 1, in an embodiment.

In order for displays 104 to retain the many-to-one functionality of our previous inventions over a local network, but still allow those displays to communicate over a wide area, they are augmented with several new components. FIG. 2 depicts enhancements to network-enabled display device 104 that facilitate use within infrastructure 100 of FIG. 1.

Components shown in red are used by a traditional network enabled display device for local media communication between client devices 102 generating media streams and the display 204 itself. Incoming media posts from one or more client devices 102 are received by the network-enabled display device 104 and converted to on-screen media posts M1, M2, M3 (See previous patents), shown as light blue on display 204 in the FIG. 2.

Image generators connect to, post media, and control shared displays by communicating with the local network display module. For example, client device 102(1) may connect to the display and post M1, and M2, followed by control signals to position M1 and M2 on the screen 204. In addition, each of these posts is associated with a video stream that is being generated by the client device, so they are updated in real time over the local network connection via a network display module 202.

The network display module 202 then determines an appropriate position, scale, and appearance of that stream and generates an image that will be displayed based on the multiple incoming media elements from several client devices 102 (in the example of FIG. 2, a second client device 102(2) is creating a different video stream M3). The final composited image is sent to the physical display device for display.

Components that are needed to augment this model and interconnect two such shared displays are as follows:

A Switchboard Communications Module 210 is responsible for non-video-based communications between the network-enabled display device 104 and the switchboard 106 (not depicted in FIG. 2). One important role of module 210 is that it may request a connection to switchboard 106 that may be authenticated if needed and rejected if the network-enabled display device 104 does not have access to switchboard 106. For example, a network subscription service may store a network-enabled display device name and its access rights to the switchboard 106. If the network-enabled display device has not purchased a subscription to the switchboard 106 and attempts to connect, the connection may be rejected.

The switchboard communications module 210 may also connect to and communicate with the access control service 108 in order to receive credentials that allow a network-enabled display device 104 to become a producer or receiver at the switchboard 106. Once access rights have been granted the switchboard communications module 210 sets up a communications with the switchboard 106 by exchanging information that will be needed to establish a communications channel between the switchboard 106 and the network-enabled display device 104. This communications channel is used primarily for video transmission in the case that the display 104 has connected to the switchboard 106 as a producer or it will be used for receiving video in the case that the display 104 has connected as a consumer.

The Switchboard Video Encoder 212 is used when a network-enabled display device 104 becomes a provider to the switchboard 106. Switchboard video encoder 212 is responsible for two tasks: 1) select and copy information being displayed on the local shared screen 204; and 2) transmit a video stream to the switchboard 106 that contains the extracted video frames. The encoder 212 is able to, for example, select the top half of the shared display 204 and transmit it is a source video to the switchboard 106. In addition to selecting and encoding a region of the shared display 204, the encoder may simply select an incoming media source (e.g., M1) from a client device 102 and transmit the selected media source to the switchboard 106 as a source. This may involve transcoding the video stream from the client device 102 but it may also simply involve retransmission of the video stream to the switchboard 106.

The behavior of the video encoders 212 (i.e. which regions are selected, etc.) is controlled by requests from the content sources (e.g., client device 102). For example, if a user wants to "mirror" a shared display to a remote location, the user could, using a simple interface on one of the client devices 102 (image generators), a control interface on the display 104 itself, or through a 3rd standalone display controller (e.g., a control panel in the room), select "mirror my display to the San Francisco conference room". The video encoder 212 would then select the entire screen and begin producing a video stream of the display to the switchboard 106 as a new source.

The Switchboard Video Receiver 214 is used to receive an incoming video stream from the switchboard 106, decode it if necessary, and to provide video frames to the local display 204. For each incoming video stream, the receiver/decoder 214 communicates with the shared display 204 to establish a new media post (e.g., M1, M2, and M3). In this way, the switchboard video receiver/decoder 214 acts as a virtual image generator on the local network, sharing media to the shared display 204 in the same way that a local client device 102 would.

Using the metadata associated with the incoming video stream from the switchboard 106, information that distinguishes this video stream from truly local feeds may be used to augment the display 204.

Exemplary use of switchboard 106—Two users in a conference room are sharing both of their laptops to display D1 (e.g., display device 104). Media elements M1, and M2, corresponding to each of those laptops is currently arranged side-by-side on the display 204. User 1 decides to "call" a remote display.

1. The user clicks a user interface element that informs the display 104 (and the switchboard modules 210, 212, and 214) that a connection to the switchboard will be made.
2. The communications module 210 connects to the access control service 108 and provides the credentials associated with a license at D1.
3. The service 108 determines that D1 is able to utilize the switchboard 106 to initiate calls and provides credentials for the switchboard 106.
4. D1's communications module 210 transmits the access credentials, its unique identifier, to the switchboard 106, along with a request for an outgoing call to anyone it is able to connect to.
5. The switchboard 106, using the switchboard directory service, searches for D1 in the service directory and returns a remote display list (unique identifiers, including intuitive names of displays that may be connected to) of displays 104 that would support a call from D1.
6. This information is received by D1s communication module 210.
7. This remote display list is then sent to the client device 102 connected to D1 that requested the call.
8. The user picks the destination display device 104 (e.g., "San Francisco conference room"), referred to as D2 herein, from the list. This selection is communicated to D1s communication module 210.
9. The communication module 210 then transmits a consumer request with the identifier of the selected display to the switchboard 106.
10. The switchboard 106 then transmits this request to the known IP address of D2.
11. Either automatically, or through user input, this request is either accepted or denied at D2.
12. D1 also transmits a producer request to the switchboard 106.
13. The switchboard video encoder 212 of D1 selects the screen 204 or a screen portion and begins transmitting the video to the switchboard 106.
14. The consumer request, upon acceptance, results in switchboard 106 forwarding the video stream from D1 to D2.
15. The D2 switchboard video receiver 214 establishes a connection and posts a new media stream into the local screen 204—one that is the entire video stream from D1 in this example.

The above process is reversed from D2 to D1 so that a duplex channel of video communications may be established. However, for full duplex, the incoming media stream from D2 is not selected by the encoder 212 at D1 and is therefore not re-retransmitted to D2.

Other Cases that are Supported by this Architecture:
  One display being "mirrored" to many displays
  Two displays mirroring their outputs to one another (as media posts)
  Only one media post at a display being displayed on one or more remote displays through the switch—the video encoder only selects a single media stream from one image generator
  The aggregate output of one display being transmitted and shown on one or more remote displays as a single "media post".
  Many media posts being selected and retransmitted to remote displays without encoding the full display.

System for Display Analytic Capture on Shared Displays

Traditional displays are connected to content sources through an explicit video cable or video transport standard that is primarily one-directional. Other than the setup stage, information outside of the video signal itself is typically not passed from the content source to the display device. Even when information is passed from the display to the content source that information is typically limited to scan line timing, device capabilities, or other video-specific data. For example, in the case when a video cable acts as the physical medium, during the setup stage an Extended Display Identification Data (EDID) structure is passed from the display to the content source so that it can supply the correct video type based on the characteristics of the display that it is connected to. This information is limited and only carries data about the device itself. In cases when a wireless or wired network is used to connect a display to a content source—this information is still restricted to data related to the physical aspects of the display itself. Because displays have, until recently, been viewed as only an output device that is driven by a single content source, video standards and the systems that implement them have not considered more flexible communication architectures that are full duplex. Furthermore, displays are unable to store and analyze information beyond the video stream itself.

Intelligent shared display infrastructure 100 of FIG. 1 avoids the above limitations by introducing three components to the traditional content source->display architecture. When combined within infrastructure 100, these three distinctions create a novel display system that supports the capture and analysis of display analytics in addition to simply displaying information provided by the content source.

First, a new communications mechanism is introduced that supports the transfer of video metadata in parallel with the video stream itself. Examples of video metadata include the spatial location of the content source (e.g., client device 102), the login name of the user currently accessing the content source, the length of the content that is being streamed, the revision history of the content, information about the content source platform (i.e. the operating system of the PC when the content source is a computer).

Secondly, a display analytics database module, associated with each display 104, is able to capture and store metadata related to incoming video stream connections from clients. This module, associated with the display involves a database that stores events, metadata, and potentially sections of the received video streams. In addition, the data can be processed to derive store summary statistics, and automatically associate metadata with video data.

Finally, a mechanism for accessing and displaying information that is stored in the display analytics database module is provided to support third-party access to the capture data. This mechanism is a network-enabled process that is able to connect to the display, selectively request access to the analytics data, and then display that data to a user.

Figure 3A:
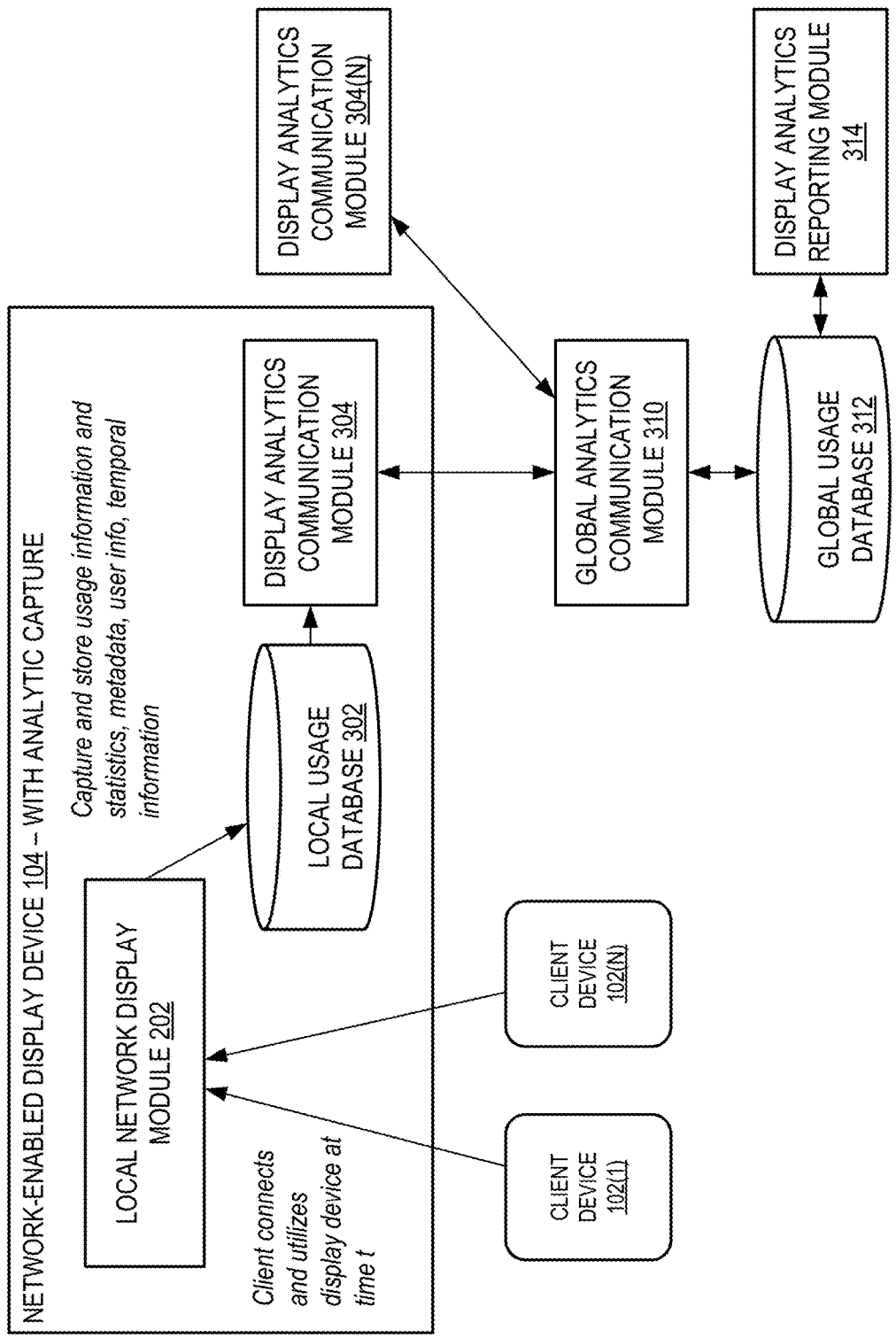
FIG. 3A shows one exemplary network-enabled display device augmented with analytics capture, in an embodiment.

FIG. 3A shows one exemplary network-enabled display device 104 augmented with analytics capture.

In one example of operation:
1) Client devices 102 connect to a network-enabled display device 104 at periodic times to stream media, control media, and exchange metadata.
2) Usage information from these activities are captured and stored in a local usage database 302. Statistical information (i.e. accumulated information about number of connections, number of rejected connections, total bandwidth used, etc.) may also be stored in the local usage database 302. A global analytics communications module 310 may connect to the network display device 104 through a display analytics communication module 304 and request information that is stored in the local usage database 302. —OR— the display analytics communication module 304 may connect and transfer all or part of the information stored in the local usage database 302 to global analytics communication module 310. The global analytics communication module 310 may communicate with any number of these modules 304 (and display devices 104) on a network.
3) The information from one or more network-enable display devices 104 is stored in a global usage database 312. Further statistical information related to intra-display information (i.e. the total bandwidth used for all displays) may also be stored in the global usage database 312.
4) Information store within global usage database 312 may be read and processed either through interactive queries, reports, or rendered visually as graphical information through a display analytics reporting module 314.

Figure 3B:
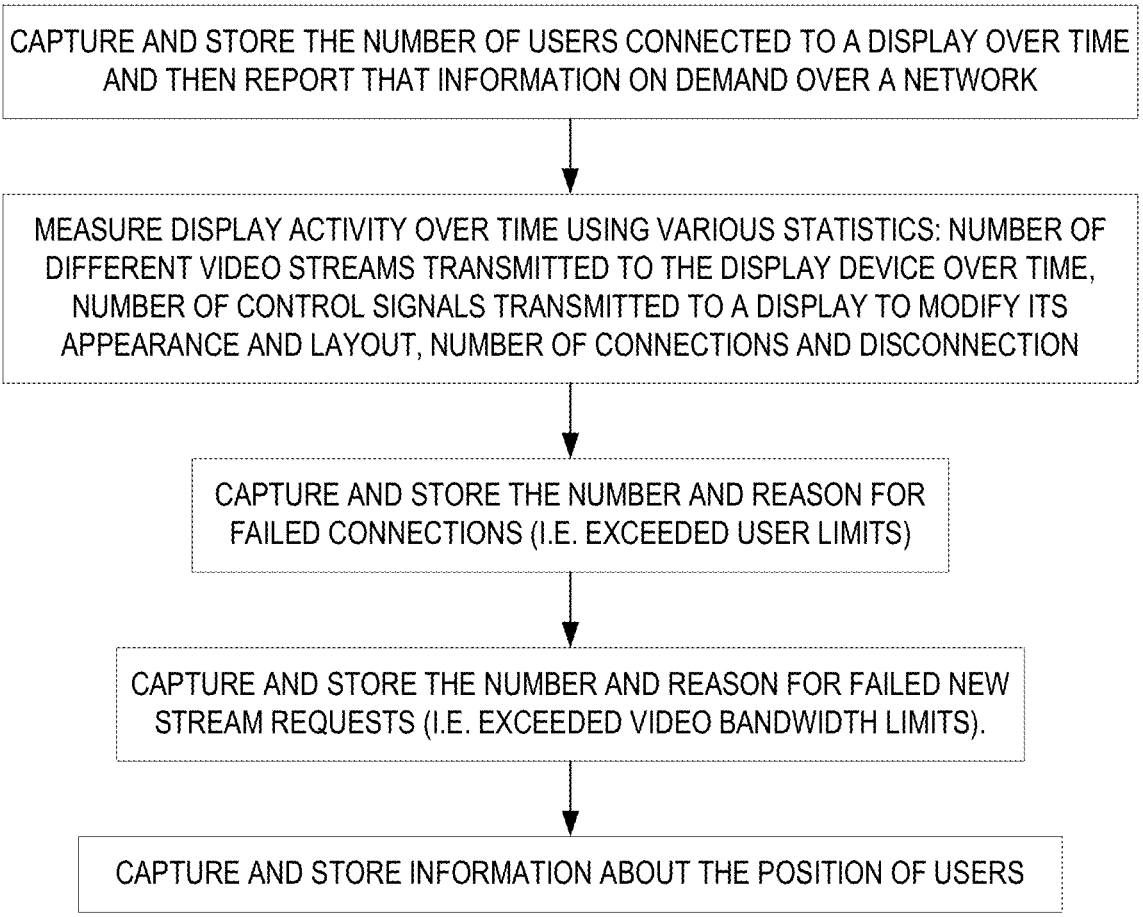
FIG. 3B is a flowchart illustrating exemplary steps for display analytic capture within the augmented network-enabled display device of FIG. 2, in an embodiment.

FIG. 3B is a flowchart illustrating the following steps for display analytic capture, in an embodiment. This flowchart implements the following steps:
1) Capturing and storing the number of users connected to a display 104 over time and then reporting that information on demand over a network.
2) Measuring display 104 activity over time using various statistics: number of different video streams transmitted to the display device 104 over time, number of control signals transmitted to a display 104 to modify its appearance and layout, number of connections and disconnection.
3) Number and reason for failed connections (i.e. exceeded user limits)
4) Number and reason for failed new stream requests (i.e. exceeded video bandwidth limits).
5) Capturing and storing information about the position (e.g., geographical location) of users.

Multi-User, Multi-Video Stream Visual Association Groups

The ability to "stack" many media streams together for user interaction and organizational purposes. Stacked media is marked as stacked together and then displayed as a single visual element along with other posts.

Stacks are:
created—by selecting a single stream that will be in the stack or through some other UI element. Denoting media posts on a shared display that should be put in a stack. For example, by dragging a media post over a stack and dropping it into the stack.
Modified—by editing the elements in the stack to order, delete, remove, or add elements. Stacks have an implicit order as well as a "focus element".
Exploded—all elements in the stack are removed.
Ordered—elements in the stack can be reordered through user interaction elements.
Cycled—the focus element is always rendered "on top" and visible in the shared display, by cycling a stack the focus element may be changed interactively.
Displayed—the stack element is rendered as a post on the shared display. The focus element on the display is show on top.

Stacks are a feature that is valuable in the context of multi-source video streaming to a shared display. Stacking multiple live sources enhances organizational and visualization capabilities for the set of users trying to utilize the display for decision making and collaboration. Prior art technologies for multi-source display and control only support arrangements of the sources wherein a source is either visible or not visible on the screen. When a source is visible it is typically arranged in a grid or other regular pattern based on the size and number of other media source that share the display. For example, video wall controllers and video scalars are used to arrange many sources onto a screen but the mapping between each source and its location/size on the screen is fixed and in a regular grid.

Stacks support logical arrangement of the video sources that are being transmitted to a display so that they may be visualized, grouped, and controlled, in ways that are visually connected.

Once grouped, stacks may be manipulated/arranged on a display 204 in a similar way to other video streams. However, when a stack is repositioned on a display (or scaled/rotated) the current members of the stack are updated accordingly.

Figure 4A:
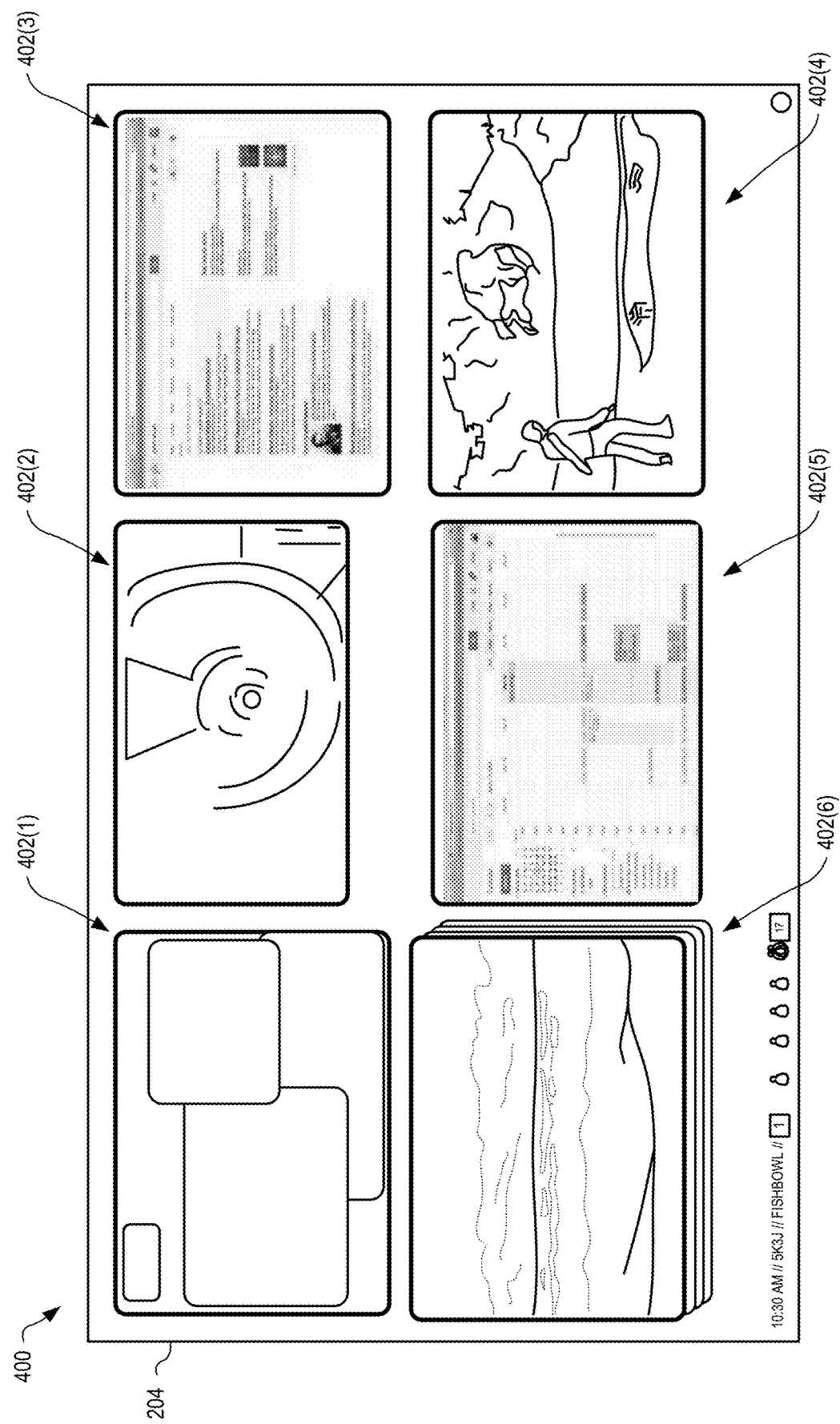
FIG. 4A shows images depicting a shared display that is displaying six media posts, in an embodiment.

FIG. 4A shows display 204 of network enabled display device 104 of FIGS. 1 and 2 and/or augmented network-enabled display device 300 of FIG. 3A illustrating a shared display with six media posts 402(1)-(6) (e.g., M1, M2, M3). Five of those posts 402(1)-(5) are a traditional video stream received from a content generator (e.g., client device 102) and then positioned on the shared display 204. Media post 402(6) is a visual element that includes multiple media streams that have been organized into a "stack" that is shown on the shared screen 204 as a single post. A video of an ocean scene is the current focus of the stack and is displayed in the visual element location.

The visual appearance of stack 402(6) is augmented such that a viewer of display 204 understands that several video streams organized together. As shown in FIG. 4A, the stack post 402(6) is rendered to show multiple post borders to give the appearance of a "stack". In another embodiment, an additional icon on the group of video streams may be included to denote a group or stack of visual elements (e.g., video streams). By modifying the on screen parameters of the visual element, including scale, position, rotation and other appearance modifiers, each element within the stack inherits these changes and move, scale, and rotate accordingly.

Figure 4B:
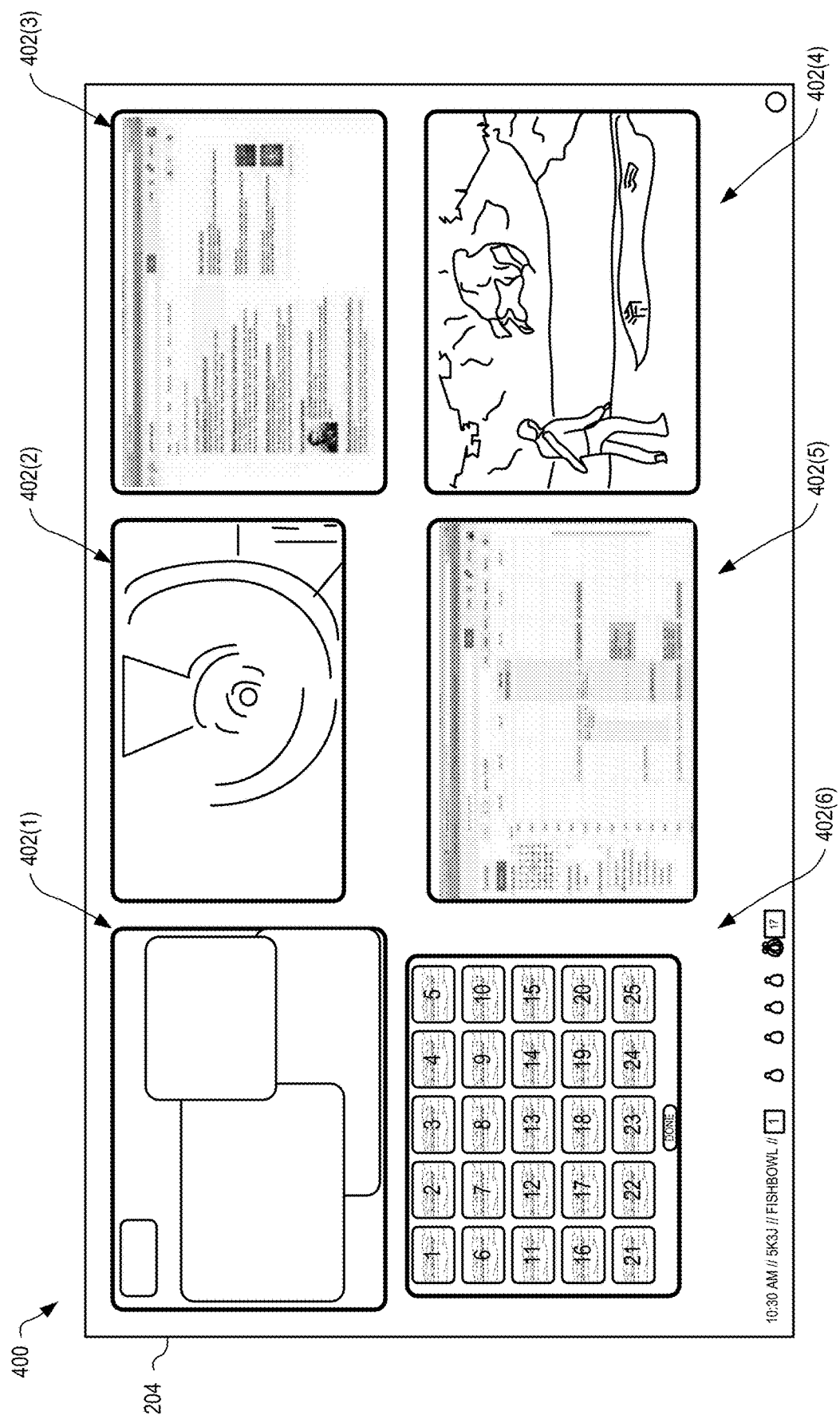
FIG. 4B depicts editing of a visual element that represents a group of media posts, in an embodiment.

FIG. 4B depicts editing of a visual element 402(6) of FIG. 4A that represents a group of media posts. In this example, visual element 402(6) represents a stack containing 25 video streams that may be reordered or removed from the stack. In addition, users may add video streams onto the stack 402(6) by dragging them into the stack edit window (visual element) as shown. For example, a stack that contains the 25 elements may also add a new video stream from a different image generator simply by moving it into the visual element representing the stack.

Figure 4C:
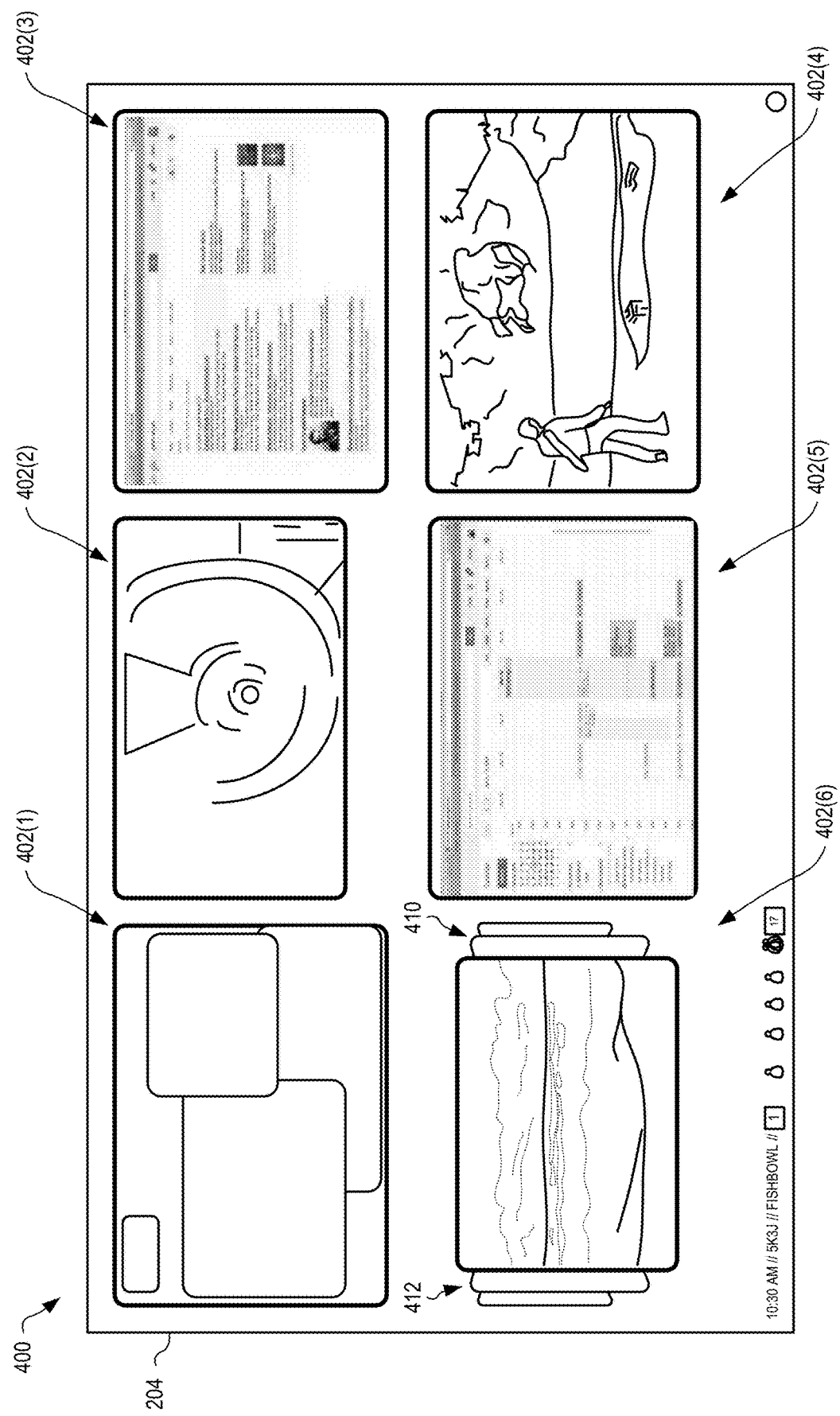
FIG. 4C depicts how a user may visually cycle the media posts within the visual element of FIG. 4B, in an embodiment.

FIG. 4C depicts how a user may visually cycle the media posts within the visual element 402(6) of FIG. 4B. The current focus element is displayed in the foreground of the stack 402(6) and the sequential position of next 410 and/or previous 412 elements of the stack are also depicted in part. A user may interactively provide commends to cycle through elements in the stack such that the focus element changes and different video streams of the stack are brought into view.

Stacks (e.g., stack 402(6) may be controlled in a distributed manner, any user/content source controller connected to the display may create, modify, delete, and cycle stacks through their own UI, when they have access rights to do so.

Display Scheduling for Shared, Multi-User, Multi-Source Displays

Use of display device 104 of FIG. 1 may be scheduled. Typically, availability and use of prior art display devices was controlled by physical connectivity. A user attaching a content source to a display device defines the use of that device. Alternatively, access control (e.g., password/login) to functionality of a computer attached to the display controls use of the display device. That is, prior art display usage was defined by the physically interconnect between the display device and the content source, or the display device utilization was based upon demand of users connecting to the display when it is available (i.e., when other users are not physically or otherwise connected to the display device).

In systems where wireless technologies are used to transport video to the screen, users are able to connect on demand. Limitations to connections are typically physical or only support more traditional access rights such as user accounts. When using a display like a shared resource, there are no ways to schedule and lock the display for specific use.

Room schedulers schedule "meetings" that involve individuals, room access, call setup for teleconferencing, etc. However, a room scheduler does not prevent a user from walking into the room and using, through traditional methods, a display device (e.g., display device 104) located within the room. For example, because video cables do not explicitly carry information about access rights and scheduling, any user with access to a physical video cable connected to a display device may typically access that display device irrespective of any scheduling control.

A room scheduler may be improved to send scheduling information to the display device 104, which allows the display device to: 1) control display access for the network-enabled display device and 2) modify the appearance/behavior of the shared network-enabled display. With display scheduling (also referred to herein as the scheduling system), display device 104 and/or intelligent shared display infrastructure 100 includes an intelligent layer that is "aware" of scheduled events such that if a group of users schedules the display device 104 as a resource at a particular time, the network display module 202 within the display device 104 will not receive connections from users outside of the scheduled group of users. Behavior change examples might be that a user is denoted as "host" in the scheduled meeting and this information is used to provision "moderator" rights to that user so he/she may control the shared display device 104, and accept/reject new media streams from others in the meeting. In addition, appearance on the display 204 may change according to the scheduling. For example, when 30 seconds are left in the scheduled meeting, a countdown timer may be displayed over the streamed media and/or the media streamed from each user may begin to "Fade". Display scheduling operates at a different level from room-scheduling systems.

Because this invention allows displays to be treated like shared and accessible infrastructure, it is important that management tools are introduced to allow users to access those displays at pre-determined times.

Figure 5A:
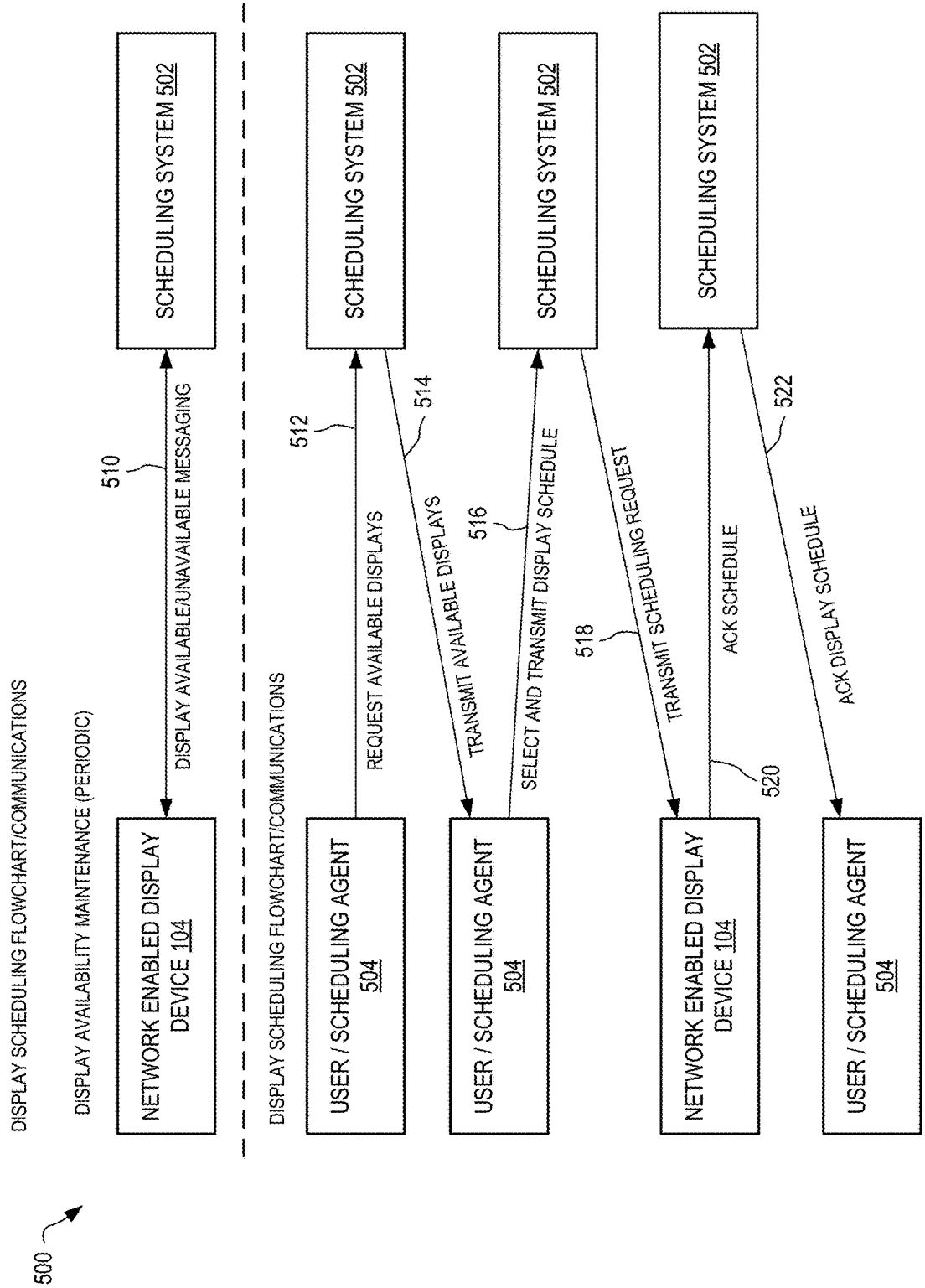
FIG. 5A is a schematic illustrating exemplary communication between a networked-enabled display device and the scheduling system, in an embodiment.

FIG. 5A is a schematic 500 illustrating exemplary communication between a networked-enabled display device 104 and a scheduling system 502.

The scheduling system 502 is in contact with one or more network-enabled display devices 104 that periodically update the scheduling system 502 with availability information. Availability may also be provided to the scheduling system 502 through a $3^{rd}$ party module that maintains display availability through other means or through direct communication with the set of network enabled display devices 104. Alternatively, users may manually maintain display availability information by editing a database that contains information about display IP address, port, access rights, and times when particular sets of users are able to connect to the display devices.

At scheduling time, users 504 or other modules are able to request 512 a set of available display devices 104. This request 510 may include times that a display device 104 is needed or other metadata related to the display device (e.g., resolution, size). The scheduling system 502 then responds 514 with a set of available displays that satisfy the available display request. The user/scheduling agent 504 then transmits 516 a selection list to the scheduling system 502 that denotes which (set of) display(s) 104 is requested for scheduling. This information also may contain details about which user may connect to the display device during the scheduled time, what their roles may be (e.g., guest versus presenter), and the scheduled time.

The schedule request is forwarded 518 to the network enabled display 104 to ensure that the display device 104 is able to meet the schedule—for example if the display device 104 has, in the meantime, been scheduled to shut down, or has lost its network connection, it may not be available to meet the scheduled request. In addition, information about the schedule is stored at the network-enabled display device 104 to potentially modify the display 204 appearance and behavior of how media streams appear, which users may connect, and what control capabilities users have.

Once a display device has acknowledged 520 the scheduling request, the scheduling service 502 updates its own information to reflect the schedule change. Finally, the scheduling service 502 notifies 522 the user 504 that scheduled the display. Note that this notification may also be sent to more than just that one user, and could include a message to other participants that were named in the scheduling request for example.

Figure 5B:
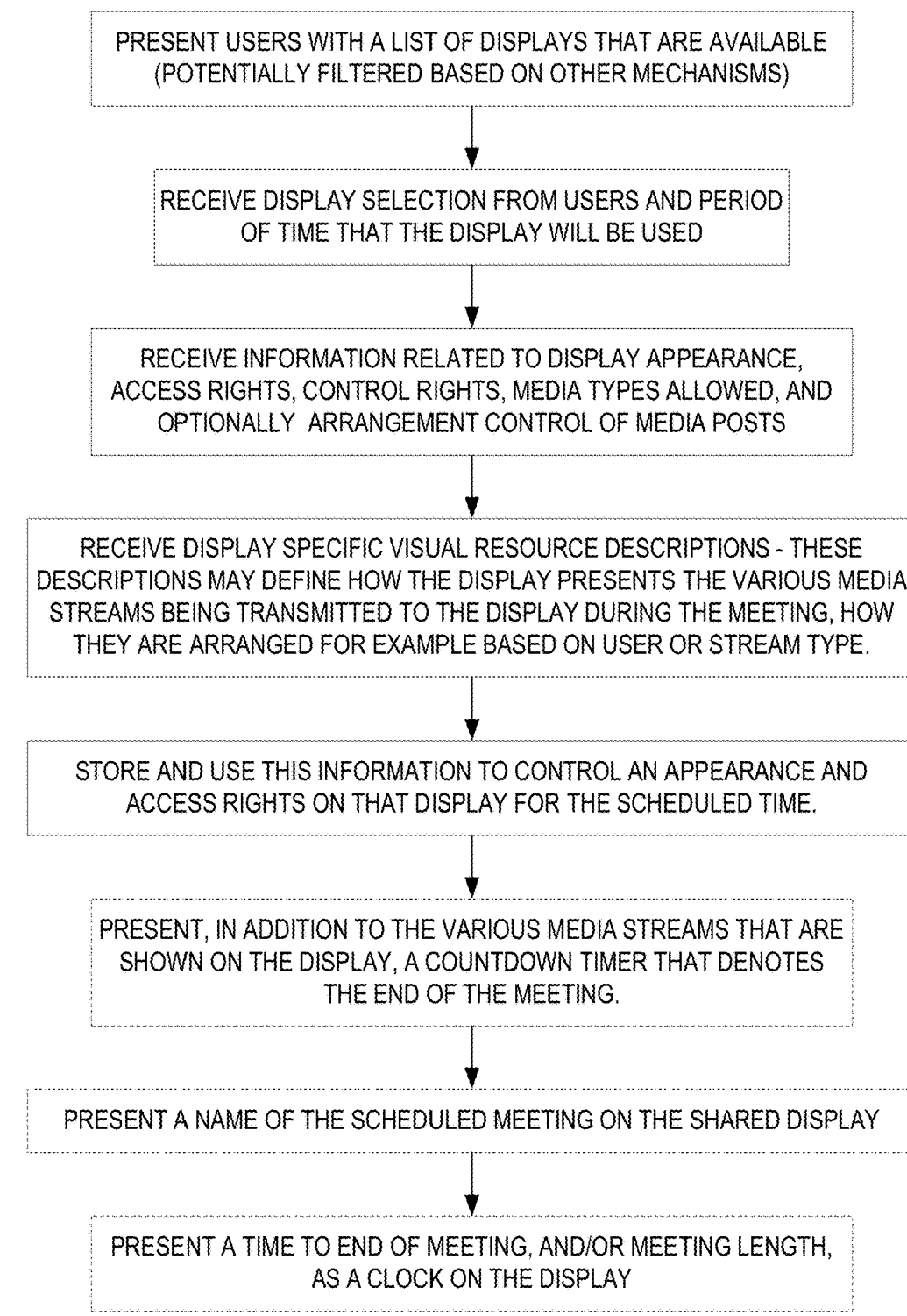
FIG. 5B is a flowchart illustrating one exemplary method for scheduling a network-enabled display device, in an embodiment.

FIG. 5B is a flowchart illustrating one exemplary method 550 for scheduling a network-enabled display device, in an embodiment. This flowchart illustrates the following operational steps:

1) Users are presented with a list of displays that are available (potentially filtered based on other mechanisms).
2) Users then select a display and determine a period of time that the display will be used.
3) Information related to display appearance, access rights, control rights, media types allowed, and even arrangement control of media posts.
4) Display Specific visual resource descriptions can also be defined. These descriptions may define how the display presents the various media streams being transmitted to the display during the meeting, how they are arranged for example based on user or stream type.
5) This information is stored and then used to control an appearance and access rights on that display for the scheduled time.
6) Presenting, in addition to the various media streams that are shown on the display, a countdown timer that denotes the end of the meeting.
7) Presenting a name of the scheduled meeting on the shared display.
8) Presenting a time to end of meeting, or meeting length as a clock on the display.

User Ownership Mappings from Indicator to Media

For display systems that are able to display more than a single content source at a time, it can be important to know how the various media streams on the screen map to the various content sources. Displays of this type are typically connected to a video wall controller where the mapping between content source and display position/size is determined at setup time and, partly, defined by the physical interconnections between the content sources and the display.

Figure 6:
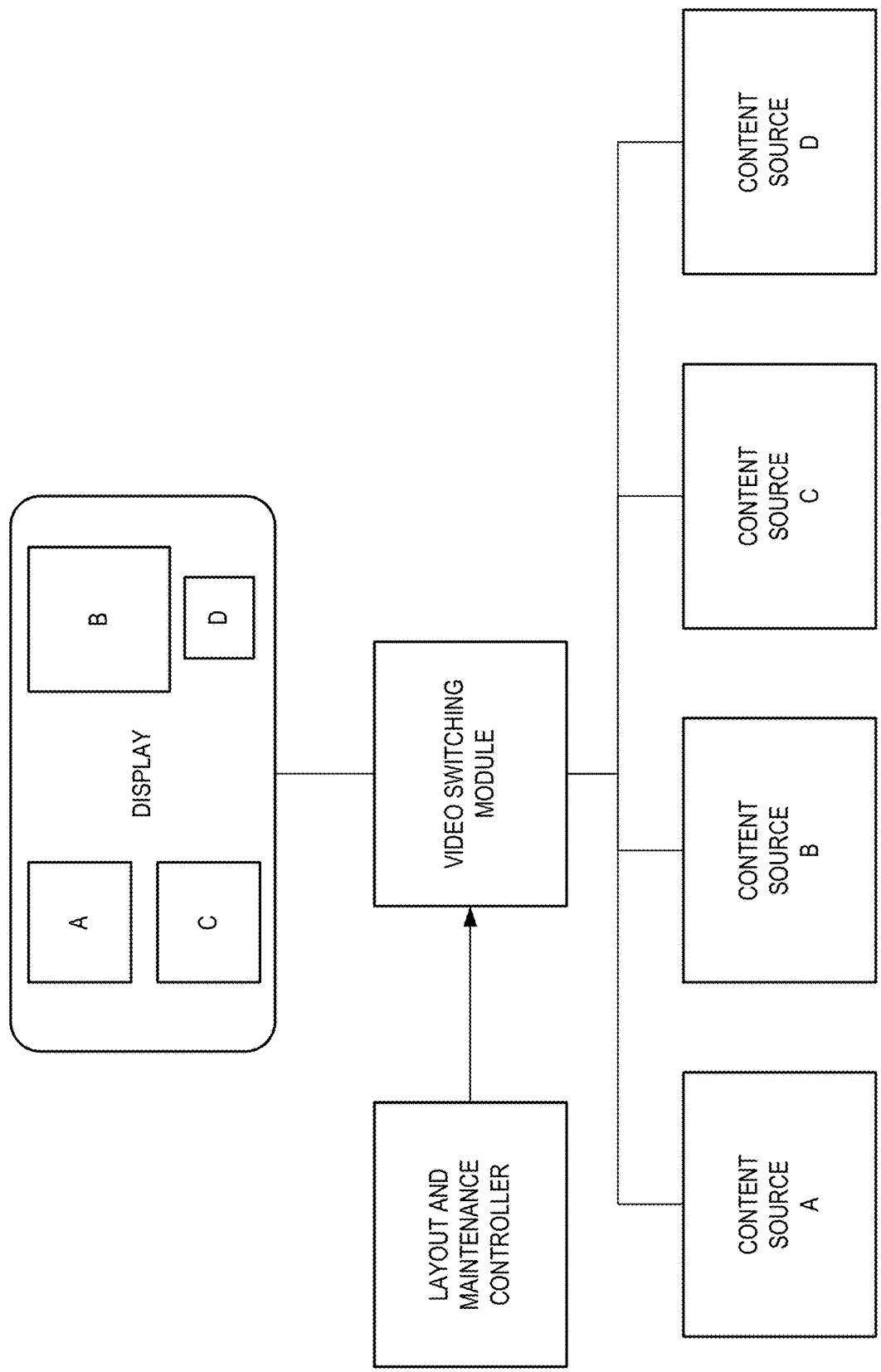
FIG. 6 depicts a traditional many-to-one video system that maps content sources to positions on the display, in an embodiment.

FIG. 6 depicts a traditional prior-art many-to-one video system that maps content sources to positions on the display. This is accomplished using a layout and management controller module that informs a video-switching module about how to map each of the input sources. In these systems, the size and position of each media a centralized layout and management controller determines element positional mapping. This controller is an independent system that is operated or programmed to modify the behavior of the switching module.

Traditional Many-to-One Video Switching System.

Limited number of sources identified at layout and management time. Centralized control of layout. There is little need to quickly identify the correspondence between content source and position on the display because these mappings are determined typically by a single source controller and they change rarely. When distributed control of media mappings is possible, the mapping of content source to its appearance on the display becomes potentially complex. Because we introduce a network-enabled display device that potentially may receive many media streams from a single source (a computer streaming multiple application windows as well as a video file, for example) there is not a one-to-one mapping of image generator to video stream on the share display. What is needed is a method to visually identify correspondence between the many media streams and their image generator sources.

Figure 7:
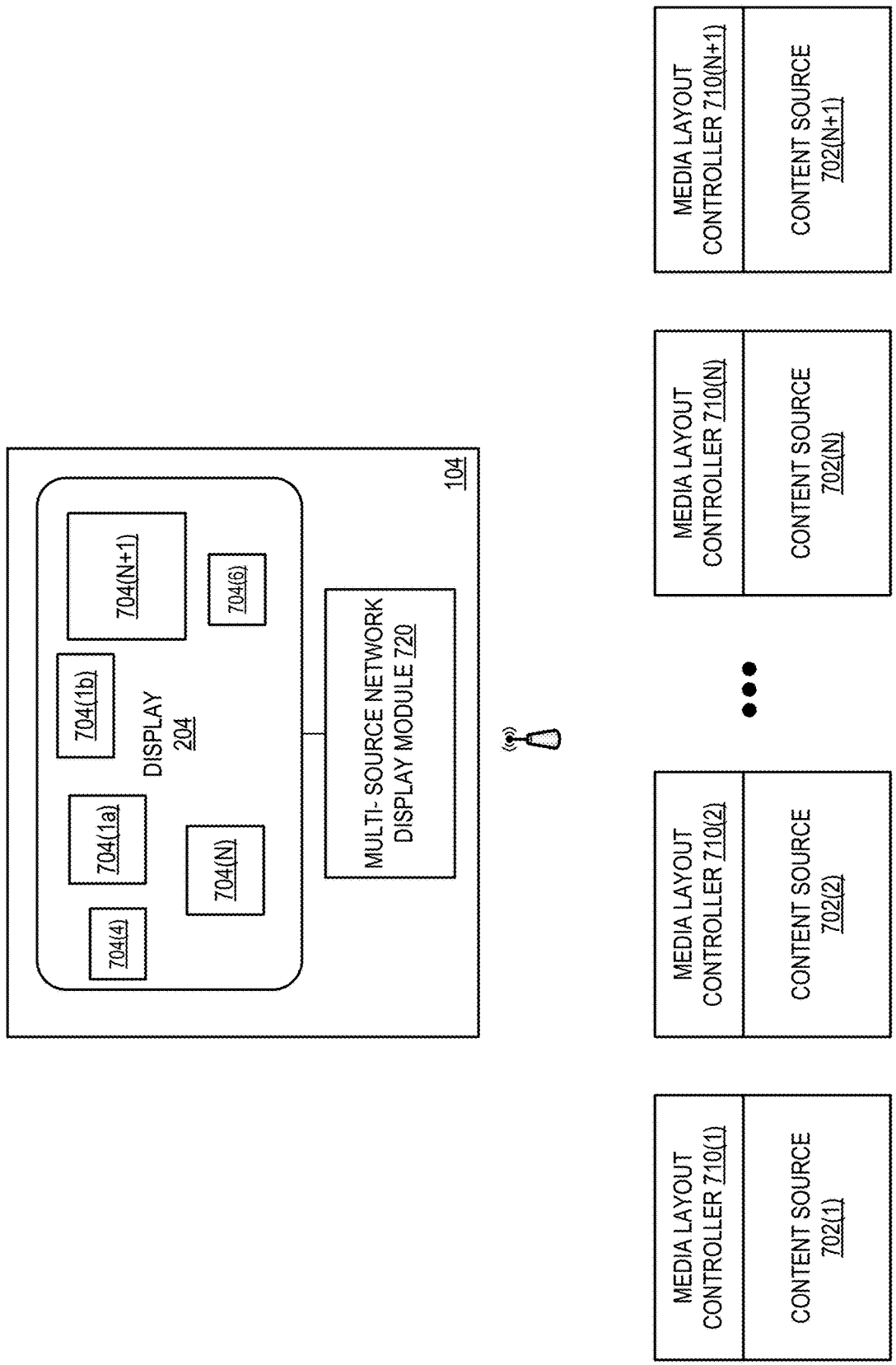
FIG. 7 depicts one exemplary distributed content production and control system, in an embodiment.
Figure 8:
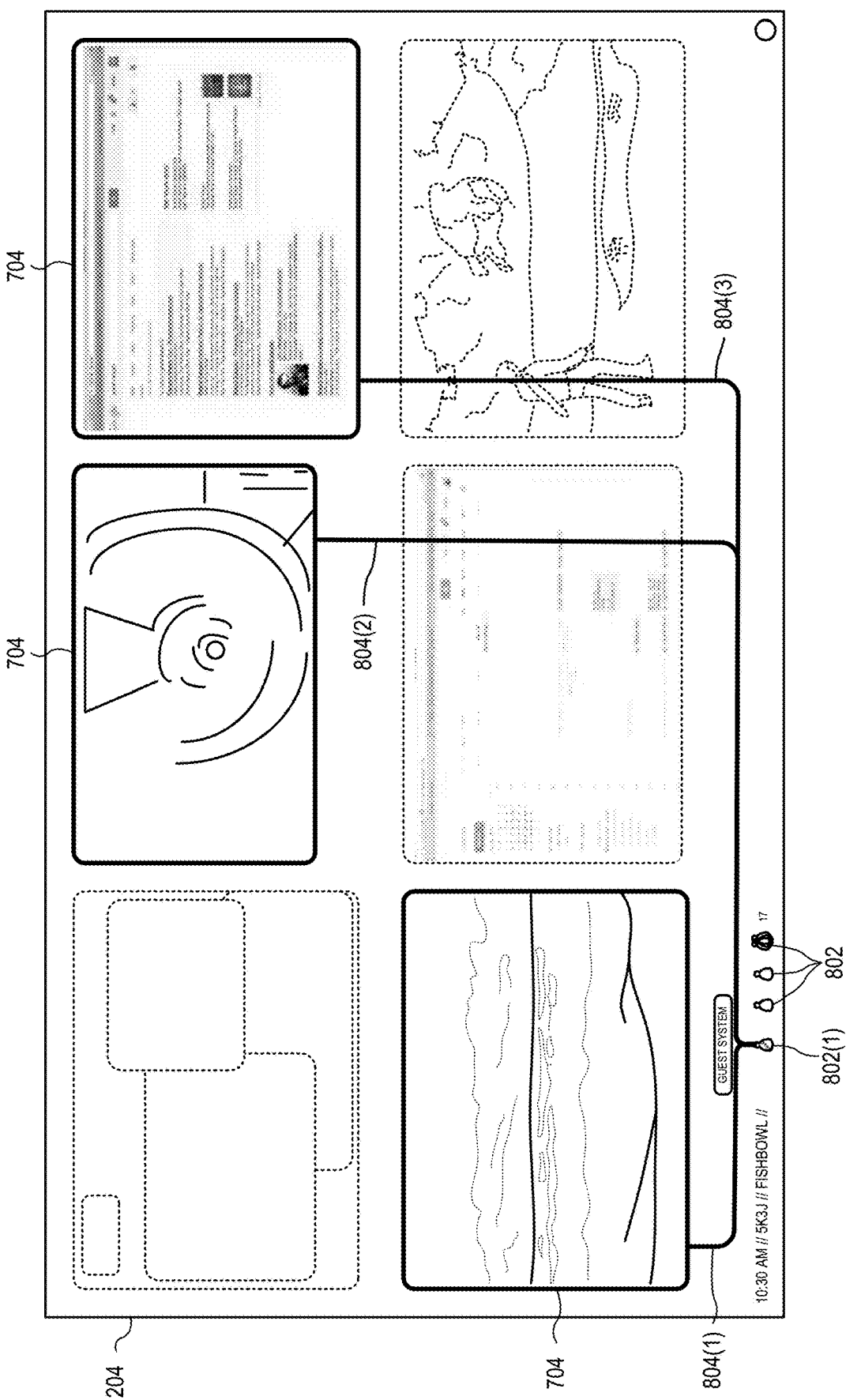
FIG. 8 shows exemplary owner-to-media ownership mapping, in an embodiment.

FIG. 7 shows one exemplary distributed content production and control system 700. FIG. 8 is an example of owner-to-media ownership mapping. FIGS. 7 and 8 are best viewed together with the following description.

Users may quickly reposition and scale media on display 204 at run-time, and therefore mapping between content source and its corresponding visual appearance on the display 204 may be difficult to understand. Furthermore, a single content source may generate more than one post 704. In the example of FIG. 7, a plurality of content sources 702(1)-(N+1) (e.g., client devices 102) are shown. Content source 702(1) has connected to the display device 104 and is streaming two independent streams to the display device 104 that are displayed as posts 704(1a) and 704(1b).

To allow users to understand the mapping between media source and displayed videos quickly and simply, distributed content production and control system 700 visually denotes this mapping on the display 204 itself. This comprises:

1) a visual representation being shown on the shared display of the content source (see our Visual indicators of Presence . . . patent). This is the content source icon 802.
2) a system that transports metadata in addition to the video data that denotes ownership/origin of the video. This is the ownership metadata
3) a display-side capability that reads that metadata and maintains an ownership>video map. Media ownership database.
4) The visual indication of the ownership map on the shared display. Ownership indicators 804.

Dynamic updates to ownership from new metadata messages from the content sources or elsewhere should be covered (for example, a user "hands" control of a video source to a second source). The ownership indicators can be indicated a number of ways on the shared display. Examples are:

A set of lines 804 that connect the content source icon 802 to each of the video sources (e.g., posts 704) owned by that content source as currently indicated in the media ownership database Temporal animations that show ownership by moving media to regions on the screen where the source icon is located based on the currently indicated media ownership database Content sources/users are able to activate, turn-on/off the visual indicators through interaction with their own controllers by sending messages to the network display module/display.

Visual ownership indicators (e.g., icons 802 and lines 804) may be activated automatically when events occur. For example, when a new content source connects, when media layout controller modifies the arrangement of the sources on the shared display, when the there are changes to the content source itself (i.e. a word document is edited at a content source that is content source streaming live).

Ownership indicators can also encode information about the owner. For example, a content source's user information, location can be encoded as part of the visual ownership arrangement.

As shown in the example of FIG. 8, content sources (e.g., client devices 102) are denoted by the set of icons 802 at the bottom of display 204 and may each denote a user, her/his name, and so on. The three media streams being produced by that content source are denoted by low-lighting (e.g., reducing intensity of) other elements (posts 704) on the shared display 204, blurring those elements and then drawing lines 804 from the icon 802 that denotes a content source to the posts 704 themselves. As shown in FIG. 8, these visual effects, as well as animations, may be used to quickly identify which content source (post 704) is generated each of the video sources.

Accept/Reject Control with Metadata Previews

When a display 204 is being shared, it may be important that end users are able to moderate both access and publishing rights. Display device 104 differentiates users into two classes: guests and moderators. At connection time, display device 104 authenticates content sources (e.g., client devices 102) into one of the two classes either through a password or other mechanism. Note that it is possible to have a group of moderators who are moderating one or more guests.

Moderators are able to reject/accept connections from new content sources that are in the guest category as well as accept/reject new media posts. In both cases the moderators are presented with metadata regarding either the connection request or the post so they are able to judge whether to make an "accept" or "reject" response.

Figure 9:
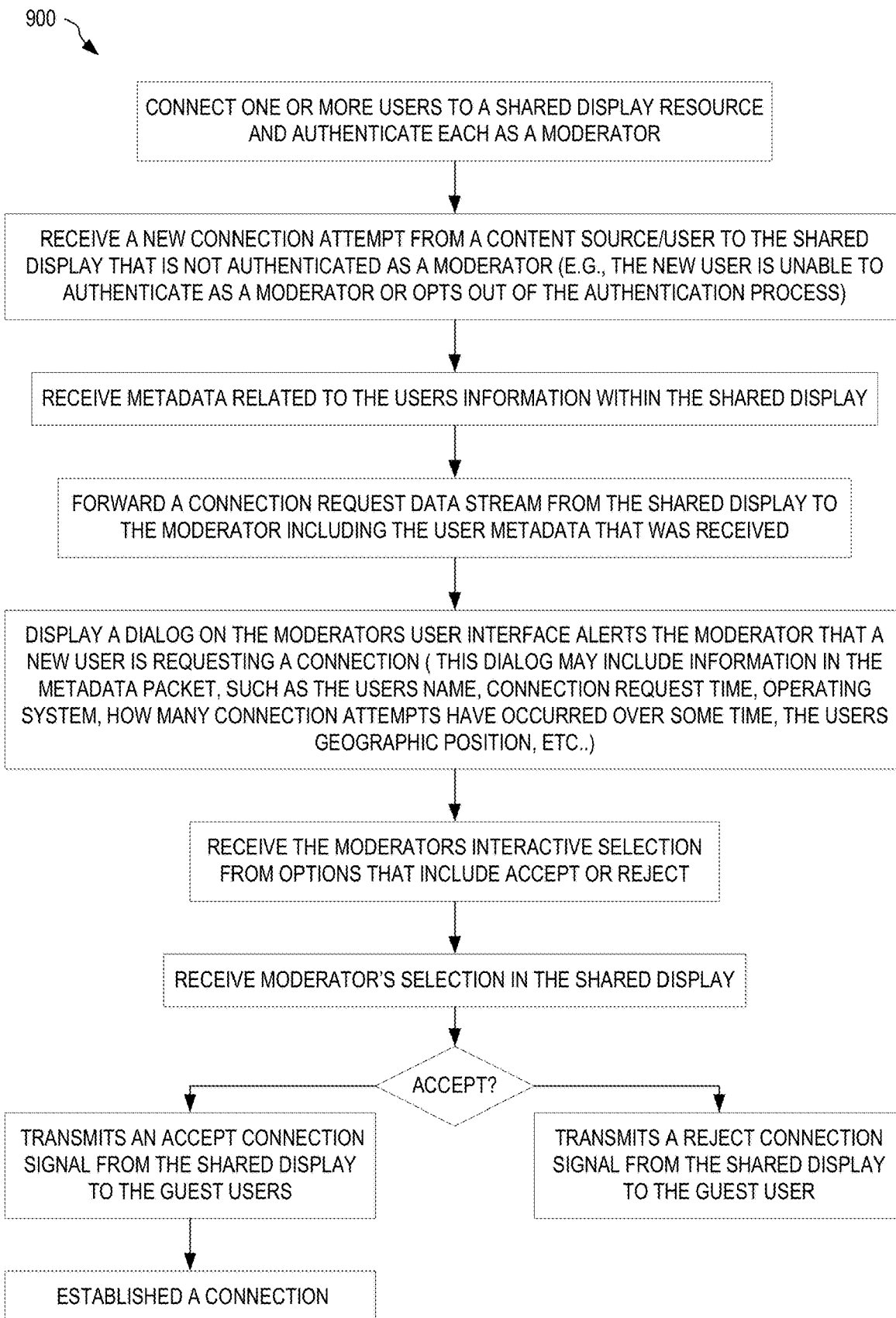
FIG. 9 is a flowchart illustrating one exemplary method for implementing control of a connection event, in an embodiment.

FIG. 9 is a flowchart illustrating one exemplary method 900 for implementing control of a connection event.

Steps in a Connection Event.
1) One or more users connect to display device 104 and are authenticated as a moderator.
2) A new connection attempt from a content source/user to display device 104 occurs—and—the new user is unable to authenticate as a moderator or opts out of the authentication process.
3) Metadata related to the users information is transmitted to the display device 104.
4) The display device 104 forwards a connection request data stream to the moderator including the user metadata that was received.
5) A dialog appears on the moderators user interface that alerts the moderator that a new user is requesting a connection. This dialog can include information in the metadata packet. Examples of the metadata include the users name, connection request time, operating system, how many connection attempts have occurred over some time, the users geographic location, etc.
6) The moderator interactively selects from options that include accept or reject.
7) This choice is transmitted to the display device 104.
8) The shared display then transmits an accept connection signal to the guest users and a connection is established—or—the display device 104 transmits a reject connection signal to the guest.

The process described above is repeated when guest users are connected to the shared display and attempt to post a new stream of media. However, in the case of a new media post, the moderator ultimately receives, as part of the metadata packet, a preview image of the post that the guest is attempting to post.

In the case that the media post is a video or live application window/desktop the media stream is transmitted to the display and forwarded to the moderator client in the form of a low frame-rate thumbnail video preview. This video preview for moderation in the context of a user who is moderating, dynamically, the ability of image generators to create a new video stream to a share display device is unique. Once accepted, the video is then displayed on the shared display.

In both cases, rejection by a moderator can be forwarded back to the guest client and notification of rejection occurs in a UI element that can include metadata about the moderator "Bob rejected your post".

Self-Arranging Smart Video Streams on a Shared Display

In the case where users do not want to control layouts directly, or would like to override their explicit control of media arrangements when important information in the video streams themselves occur, display device 104 includes a smart video streaming arrangement utility.

Figure 10A:
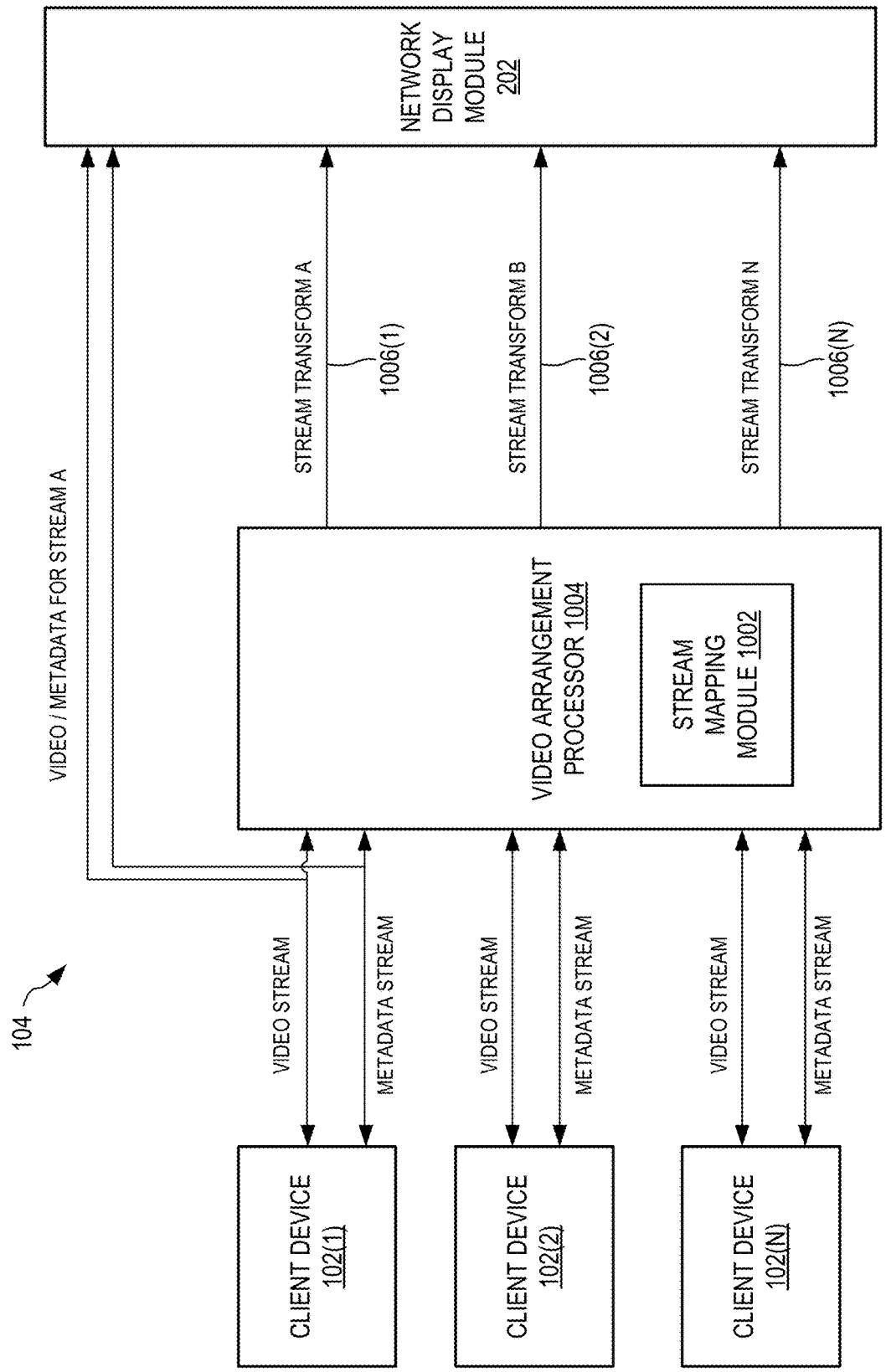
FIG. 10A shows an overview of an exemplary stream mapping module illustrating interaction with a shared display, in an embodiment.

FIG. 10A is a schematic illustrating one exemplary stream mapping module 1002 for automatically determining a target multi-video stream layout. Module 1002 utilizes the metadata and the video data being transmitted to the display device 104 to automatically determine a target multi-video stream layout for posts 704 on display 204. Stream mapping module 1002 receives video and metadata streams that are associated with each media post on the display device 104, processes those streams, and then transmits a stream transformation to the display device 104. Content sources (e.g., client devices 102), connected to the display device 104, are already transmitting one or more of these video/metadata stream pairs. A video arrangement processor 1004 is responsible for capturing these streams and processing the video data as well as the metadata in order to determine the correct transform to then transmit. This is accomplished by applying one or more of the Stream Mapping Modules 1002 to the incoming streams. Each stream mapping module 1002 is an algorithm that process streams and then determine a corresponding stream transform 1006(1)-(N).

Stream transforms 1006 are received by the network display module 202 and then applied to the visual representation of that video stream on the display 204. In this way the visual arrangement of the different video streams on the shared display is impacted by the video content itself.

One or more stream mapping modules 1002 may be associated with the video arrangement processor 1004 and each module 1002 may be associated with zero or more of the content video/metadata stream pairs.

For example, a simple example of a stream mapping module would be to compute the mean intensity in a video stream over time and then, based on the video intensity output, producing a stream transform that includes a horizontal translation. The result of this would be to automatically arrange "darker" videos to left of the shared display and brighter images to the right.

Note that stream transforms may be geometric in nature but may include anything that has to do with the visual appearance of the stream. For example, the transparency, display depth, if the video corresponding to the stream is drawn with a border, or even if a stream is currently shown on the screen, may all be defined by the output stream transform.

A second example would be a stream mapping module 1002 that detects changes in a video stream and produces a stream transform packet that informs the display device 104 to scale the video stream by 2× and to display that stream in front of other streams on the display 204. In this way a security system may automatically push an "important" stream of video to the foreground and grow it with respect to the other streams on the shared display 104.

Metadata may also be used to compute the output stream transform. For example, if a content generators metadata contains the geographic location of the client then the stream transform may automatically produce a transform that arranges videos originating from clients in one part of the world into a common area on the shared display 204.

Stream mapping modules 1002 may be activated/deactivated within the video arrangement processor 1004 by sending it control signals over the network. For example, a user may connect to the arrangement processor 1004, receive a list of the stream mapping modules that are active, and then "turn off" one or more of the stream mapping modules 1002 on or off or modify which of the content sources are associated with which of the mapping modules 1002.

Figure 10B:
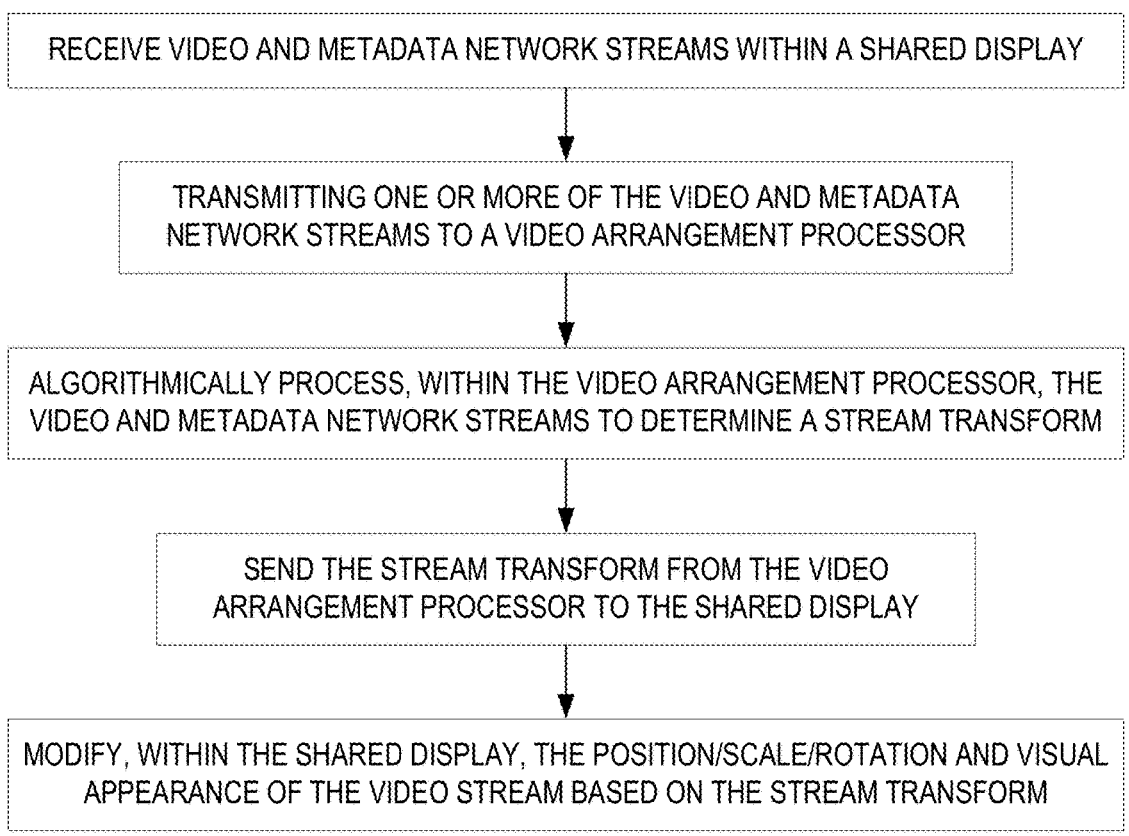
FIG. 10B is a flowchart illustrating one exemplary method for arranging smart video streams on a network-enabled display device, in an embodiment.

FIG. 10B is a flowchart illustrating one exemplary method 1000 for arranging smart video streams on a network-enabled display device 1004. Method 1000 implements the following operation:
1) Sending video and metadata network streams to a shared display 204.
2) Transmitting one or more of those same video and metadata sources to a video arrangement processor 1004
3) Algorithmically processing stream data received by the video arrangement processor 1004 to determine a stream transform
4) Transmitting the results of the stream transform to the shared display 204
5) Modifying the position/scale/rotation and visual appearance of the video stream based on the received stream transform.

Visual and Ad Hoc Peer-to-Peer File Relay System for Shared Displays

Figure 11:
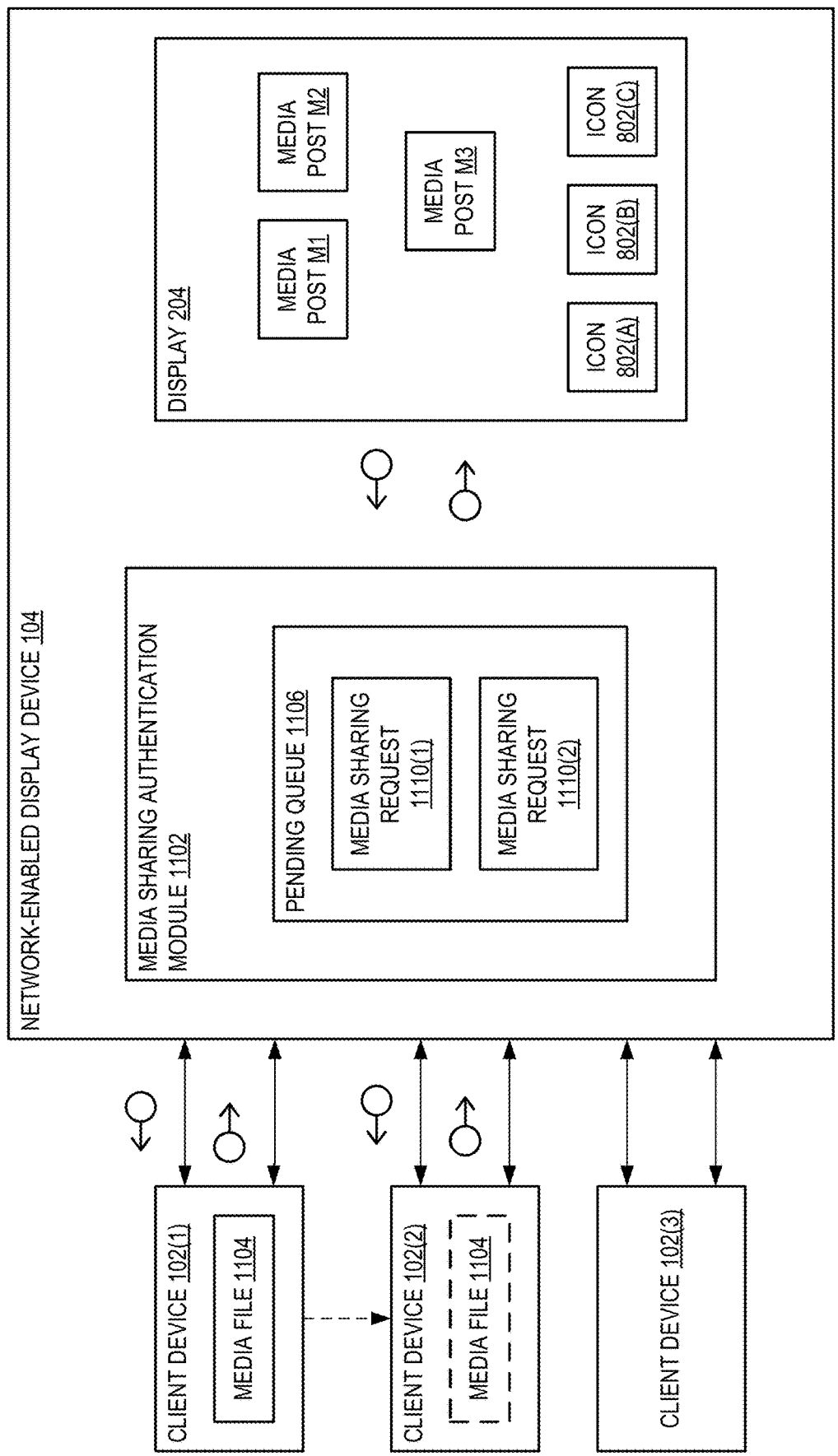
FIG. 11 is a schematic illustrating one exemplary network-enabled display device configured with a media sharing authentication module that facilitates ad hoc transfer of a streamed media file, in an embodiment.

FIG. 11 is a schematic illustrating one exemplary network-enabled display device 104 configured with a media sharing authentication module 1102 that facilitates ad hoc transfer of a media file 1104 that is being streamed to the display 204 for visualization purposes. Module 1102 allows multiple client devices 102, connected to display device 104 over a network, to stream media files, application windows, or their entire desktop, to the display 204, shown as media posts M1, M2 and M3 in this example.

In addition to media posts M1, M2 and M3, client connections are represented on the display 204 as a set of user icons 802(A)-(C). These user icons 802 and media posts M1, M2 and M3 may be retransmitted to the client devices 102 for display on their user interfaces.

An important prerequisite for this media sharing is that each media stream being transmitted to the display device 104 from client devices 102 is accompanied by metadata that encodes, at a minimum, ownership information for each of the incoming media streams. This ownership information includes the client network address and other information that is needed to establish a file transfer connection from the display device 104 and the client device 102.

Where a media stream is denoted on a user interface of a client device 102, the user may generate a media sharing request 1110 by clicking a media stream and requesting a transfer. By interacting with the media posts M1, M2, and M3 and user icons 802 on the display device 104, a user may arbitrarily request a file transfer to one or many of the other client devices 102 (including the client initiating the request). For example, by right clicking media post M1, which is produced by client device 102(1) from media file 1104, the user of client device 102(2) may request that media file 1104 be transferred to client device 102(2).

In another example, the user of client device 102(2) may drag media post M1 to user icon 802(1) that represents client device 102(2). This informs the shared display device through a set of control actions on the media posts that the user of client device 102(2) is requesting transfer of media file 1104 from client device 102(1) to client device 102(2).

The media-sharing request 1110 includes an identifier of the media stream(s) that are being requested, and the target set of client devices 102. The media sharing request 1110 is processed by the media sharing authentication module 1102. FIG. 11 is a schematic illustrating one exemplary network-enabled display device with media file sharing capability. Media sharing requests are held as "pending" by the network-enabled display. A media sharing authentication module 1102, implemented as machine readable instructions that are executable by a digital processor of the network-enabled display device 102 for example, schedules a request to the user about the pending media and is responsible for maintaining a pending queue 1106 of media sharing requests 1110. The media sharing authentication module 1102 is responsible for determining whether each media sharing request 1110 may be fulfilled. For example, module 1102 may inspect the metadata associated with the requested stream to determine (a) the sharing rights associated with the media stream, (b) whether the target client devices 102 are able to receive media (users may, for example transmit a "block all media files" message to inform the media sharing authentication module 1102 that they reject any file transfer), (c) that sharing is enabled by the display device 104, and that the target user(s) are connected to the display device 104.

A common approach may be to alert the target user(s). In this case, the media sharing authentication module 1102 transmits a sharing request to the target client devices 102 for approval/rejection by the user of those devices. When receiving this message, the client device 102 may display an interactive UI element on the client interface that requests approval for receipt of the media file 1104. Upon approval, the media file 1104 is transmitted either directly to the target client device from the source client device or relayed through the display device 104.

Source data and what is transferred on these requests may vary based on the type of video stream that corresponds to the selected media post M1, M2 and M3. If the media post is streaming from client device 102(1) as a media file 1104, then display device 104 may transport the media file 1104 to the target client device 102(2). If the video stream being transmitted corresponds to an application window or the video desktop of a client device 102(1), then an image file corresponding to desktop screenshot at the time the request is generated is transferred to target client device 102(2).

Because the display device 104 is acting as a relay, it may augment the source data based on information that is stored in the display device 104 at the time of transfer. For example, the number of users connected at the time, the arrangement of the various video streams at the time of transfer on the display device 104 may be added to the transferred file as one or more of images, video and metadata.

This interactive and authenticated file sharing process may also take place among more than two client devices 102 connected to the display. For example, suppose that two client devices 102(1) and 102(2) are connected to the same display device 104 and are each streaming media as posts M1 and M2. A user of client device 102(3), also connected to the display device 104 may indicate that post M1 should be shared with client device 102(2) (for example, by dragging post M1 on display 204 to user icon 802(B). When this occurs, the authentication module 1102 issues separate requests to each of client device 102(1) and 102(2). The user of client device 102(1), for example, who is generating post M1, may receive a request that includes information about the file transfer request: user of client device 102(3) requests that you share media stream M1 with the user of client device 102(2). At the same time, the user of client device 102(2) may receive a similar request: user of client device 102(3) requests that you receive media post M1 from the user of client device 102(1). Upon approval from both parties, transfer of the media file is initiated.

Because the user of client device 102(1) knows the type and content file source associated with M1, it may be transmitted to the display device 104 and then forwarded to client device 102(2).

Proximate Audible Discovery and Connection Mechanism for Shared Displays

Prior art either makes use of a physical video cable that pre-defines the mapping between a client image generator and a display or uses a network communications protocol to setup an ad hoc connection between a client device and a display device.

Network communication methods focus on protocols that transmit connection information from the display device to a set of potential client devices (e.g., image generators) so that the client devices may "discover" displays that are available for use. These protocols range from a network broadcast of connection information packets where any device on the network may receive those packets, to more sophisticated discover mechanisms that support only point-to-point traffic but rely on network routing tables and routing management steps.

The drawback of these approaches is twofold: 1) they rely either on a physical video cable or a network connection, and therefore only when the client device and display are on the same network will they be able to discover one another; and 2) since physical network connections may span arbitrary distances, these protocols to not inherently include spatial proximity. For example, when using a broadcast mechanism any device on the network that is shared with the display broadcasting it's information may discover connection information, regardless of location.

Figure 12:
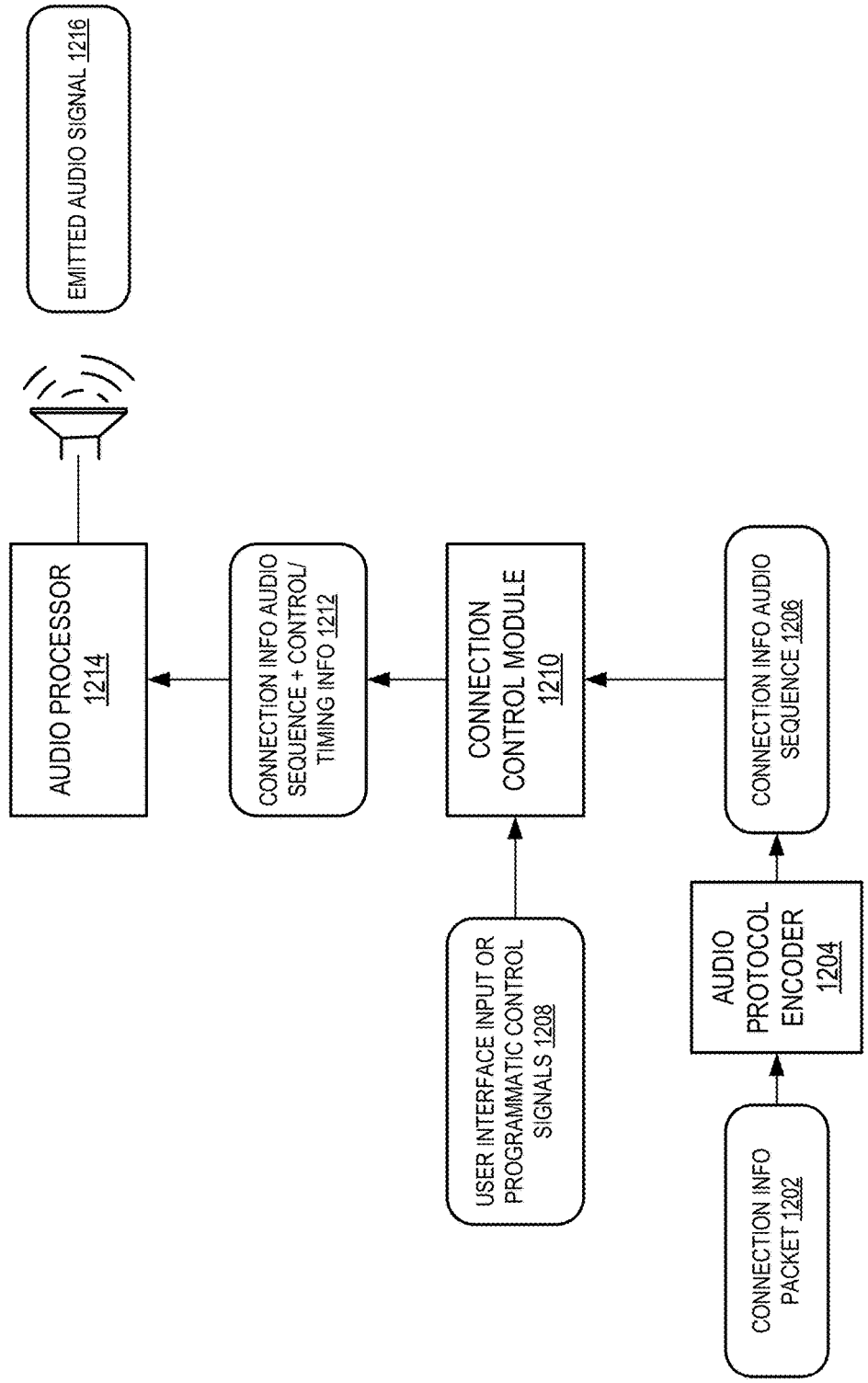
FIGS. 12 and 13 show exemplary mechanisms and protocols for proximate audible discovery and connection for a display device and a client device, respectively, in an embodiment.
Figure 13:
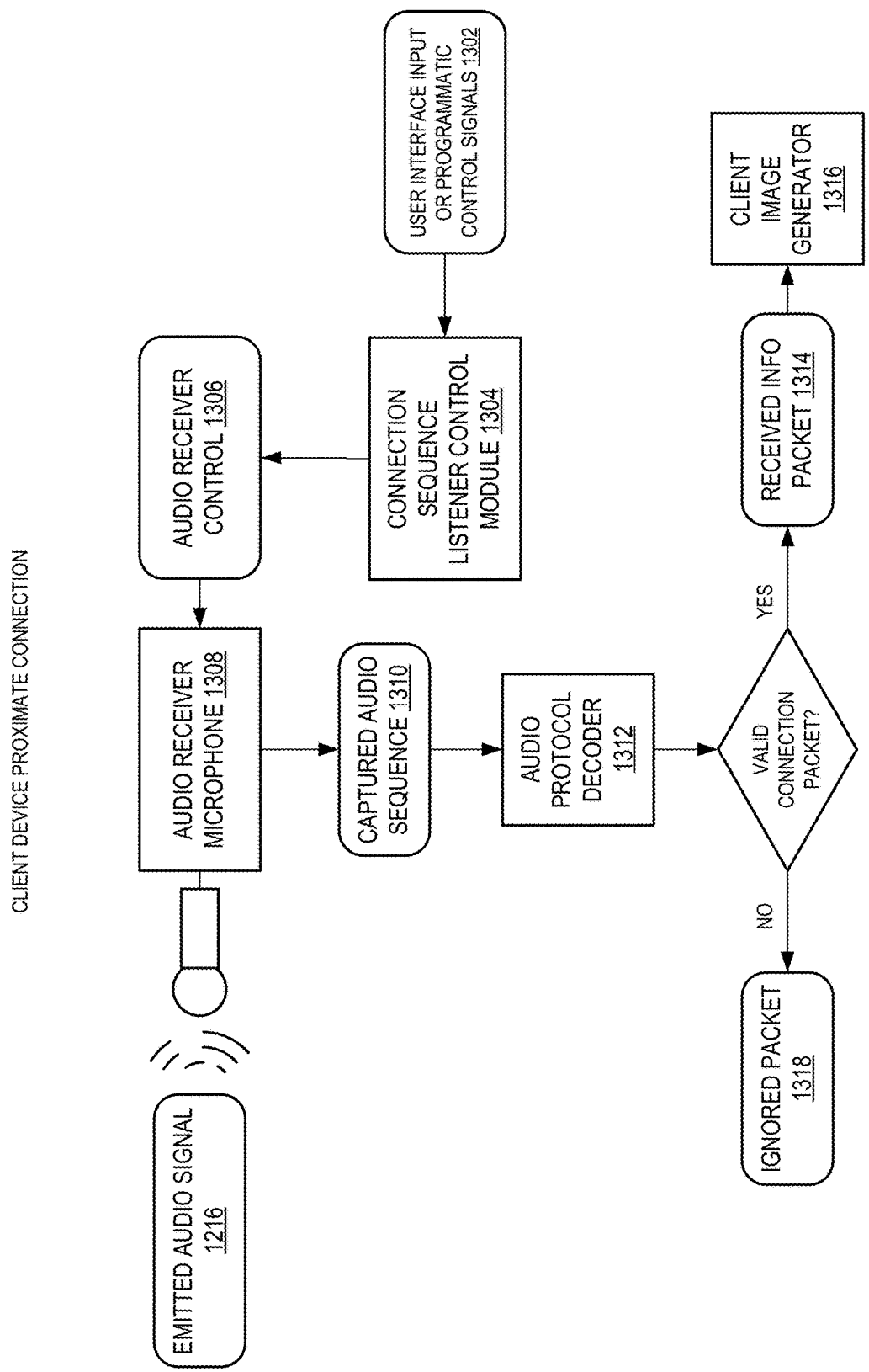

FIGS. 12 and 13 show exemplary mechanisms and protocols for proximate audible discovery and connection for a display device 104 and a client device 102, respectively. FIGS. 12 and 13 are best viewed together with the following description.

First, the shared display device 104 constructs a connection information packet 1202 that includes an identifying header that informs any reading device that the packet is a valid connection information packet. The packet also includes a display IP Address and connection Port number of the display device 104. Other network specific information may also be included in the packet such as the SSID of the network that the shared display device 104 is connected to, and the IP address of the network gateway. This packet may also include additional information about access information (e.g., whether the display device 104 requires a password), whether the display device is currently accepting new connections, how many client devices 102 are connected to the display device 104, and so on. This connection information packet 1202 is then encoded using an audio protocol encoder 1204 to generate a connection information audio sequence 1206.

The audio protocol encoder 1204 maps data in the connection information packet 1202 to a series of audio frequencies, serialized over time. That is, each data element in the connection information packet 1202 becomes an audio frequency associated with a timestamp so that data at position 1 in the connection information packet is associated with time t=0 and data at position 2 is associated with time t=1. This process generates the connection information audio sequence 1206.

A connection control module 1210, associated with the shared display device 104, is responsible for determining when this connection information audio sequence 1206 is used, based upon user interface input or programmatic control signals 1208, to generate connection information audio sequence and control/timing information 1212. The connection information audio sequence and control/timing information 1212 is then passed to an audio processor 1214 that is attached to a speaker on the shared display device 104. The connection control module 1210 may be programmed to send the connection information audio sequence 1206 to the audio processor 1214 at certain periodic time intervals or through user input at the shared display device that requests it. When active and receiving connection information audio sequence and control/timing information 1212 the audio processor 1214 drives the speaker to generate sound, resulting in an emitted audio signal 1216.

Within client device 102, a connection sequence listener control module 1304 is activated via user interface input or programmatic control signals 1302 to generate audio receiver control 1306. The control module 1304 may also be deactivated after a fixed amount of time or when user input occurs.

When activated the connection sequence listener control module 1304 generates audio receiver control 1306 to activate an audio receiver microphone 1306 that generates a captured audio sequence 1310. The captured audio sequence 1310 is input to an audio protocol decoder 1312. When the connection sequence listener control module deactivates it instructs the microphone be disable and to no longer capture audio sequences.

The audio protocol decoder 1312 receives, within capture audio sequence 1310, a time sequence of frequencies from the microphone and is responsible for decoding those signals into a series of data elements that make up a received information packet 1314. This information packet 1314 is processed by the audio protocol decoder 1312 to determine if the information packet 1314 contains valid connection information, such as by examining the header information of the received information packet 1314. Invalid packets are ignored 1318.

Valid connection information packets 1314 are then transferred to an image generator of the client device 102 and used to establish a connection between the client device 102 and the shared display device 104.

The sequence of steps to establish a valid connection may involve first connecting the device to the correct network that the shared display is connected to. A connection setup algorithm (disclosed previously) then connects the client display device to the IP address and port number contained in the connection information packet.

This connection process may be preceded by user interaction that presents information about the discovered display to a user operating the image generator client device. For example, when a valid connection information packet is received by the client device 102, a user interface dialog containing a list of one or more displays that are available connection may be presented to the user of the client device 102. This list is augmented with information contained in the received information packet 1314, including an indication of whether the display device 104 is locked, or in use by other image generators.

Once a connection between the client device 102 and the display device 104 is established, the image generator within the client device 102 then transmits a video stream and metadata stream to the shared display device 104 to produce media posts (e.g., M1, M2, and M3 of FIG. 2) that are displayed on the shared display 204.

Changes may be made in the above methods and systems without departing from the scope hereof. It should thus be noted that the matter contained in the above description or shown in the accompanying drawings should be interpreted as illustrative and not in a limiting sense. The following claims are intended to cover all generic and specific features described herein, as well as all statements of the scope of the present method and system, which, as a matter of language, might be said to fall therebetween.

What is claimed is:

1. A method for scheduling availability of a network-enabled display device, comprising:
   receiving, from a client device, a period defining future use of the network-enabled display device, the network-enabled display device being configured to receive at least two video streams generated by each of the client device and another client device during the period;
   receiving, from the client device, information defining one or more of display appearance of the network-enabled display device during the period, access rights of other client devices during the period, control rights of the network-enabled display device by the client device and the another client device during the period, media types allowed to be displayed on the network-enabled display device during the period, and arrangement control of media posts displayed on the network-enabled display device during the period;
   receiving, from the client device, display-specific-visual-resource description defining how the network-enabled display device presents a source from the another client device during the period, or how the source from the another client device is arranged on the network-enabled display device during the period; and
   storing the information and controlling an appearance and access rights of the network-enabled display device during the period based upon the information received from the user client device and the display-specific-visual-resource description.

2. The method of claim 1, further comprising displaying, on the network-enabled display device, a countdown timer that denotes the end of the period.

3. The method of claim 1, further comprising displaying, on the network-enabled display device, a name of a scheduled meeting during the period.

4. The method of claim 1, further comprising displaying, on the network-enabled display device, one of (a) a time to end of the period, and (b) a time since start of the period.

5. The method of claim 1, further comprising controlling the network-enabled display device based on the access rights such that only the client device has display control during the period.

6. The method of claim 1, further comprising: receiving, from the client device, a request of available network-enabled display devices including a time, period, and other metadata related to a desired display device.

7. The method of claim 6, further comprising transmitting a set of available network-enabled displays based on the received request.

8. The method of claim 7, further comprising, prior to the step of transmitting the set, forwarding a schedule request to each of the available network-enabled displays to verify availability thereof.

9. The method of claim 1, further comprising transmitting a verification to the client device of a scheduled network-enabled display.

10. The method of claim 1, the step of storing including storing the information on the network enabled display device.

11. A system for scheduling availability of a network-enabled display device, comprising
   a scheduler coupled with the network-enabled display device, the scheduler comprising non-transitory instructions that when executed by a processor operate to perform the steps of:
   receive a request from a client device defining a period that future use of a network-enabled display device is needed, the network-enabled display device being configured to receive at least two video streams from each of the client device and another client device during the period: transmit to the client device, a list of available network-enabled display devices at the period;
   receive a selection defining a selected display of the available network-enabled display devices; and,
   control (1) access to the selected display during the period, and (2), as defined by a display-specific-visual-resource description generated by the client device, at least one of how the network-enabled display device presents a source from the another client device during the period, and how the source from the another client device is arranged on the network-enabled display device during the period.

12. The system of claim 11, the request further defining metadata including one or more of size and resolution about a desired display.

13. The system of claim 11, the schedule further configured to, prior to the step of transmitting to the user a list of available network enabled display devices, forwarding a schedule request to the available network-enabled display devices, and verifying availability thereof.

14. The system of claim 11, the step of controlling access to the selected display including, modifying the display appearance of the selected display, modifying the behavior of how the received at least one video stream appear on the selected display, controlling which users have access to the selected display, and/or identifying roles with respect to certain users connected to the selected display.

15. The system of claim 11, the step of controlling including storing access information on the selected display such that access thereto cannot be bypassed via interaction with the selected display.

16. The system of claim 11, the scheduler being located at the selected display.

17. The system of claim 11, the scheduler further configured to eliminate access to the network-enabled display device when the period after the time has ended.

18. A network-enabled display device with schedulable availability, comprising:
   a processor coupled with a display configured to:
   receive, via a network interface, scheduling information associated with the display, the scheduling information including one or more users having access to the display, the network-enabled display device being configured to receive at least two video streams generated by each of a client device and another client device during the period, modify appearance of the display including at least some of the scheduling information;

analyze the scheduling information to control (1) access to the display from one or more clients wirelessly connected via the network interface, and (2), as defined by a display-specific-visual-resource description generated by the client device, at least one of how the network-enabled display device presents a source from the another client device during the period, and how the source from the another client device, is arranged on the network-enabled display device during the period.

19. The network enabled display device of claim 18, the processor further configured to notify one or more client devices when the scheduling information changes.

20. The network enabled display device of claim 18, the processor configured to analyze the scheduling information to control access to the display by ending access to the display for one or more client devices when a scheduled meeting has reached an end time.

\* \* \* \* \*